US006903949B2

United States Patent
Ribarich

(10) Patent No.: US 6,903,949 B2
(45) Date of Patent: *Jun. 7, 2005

(54) RESONANT CONVERTER WITH PHASE DELAY CONTROL

(75) Inventor: Thomas J. Ribarich, Laguna Beach, CA (US)

(73) Assignee: International Rectifier Corporation, El Segundo, CA (US)

( * ) Notice: Subject to any disclaimer, the term of this patent is extended or adjusted under 35 U.S.C. 154(b) by 2 days.

This patent is subject to a terminal disclaimer.

(21) Appl. No.: 10/377,681

(22) Filed: Feb. 28, 2003

(65) Prior Publication Data

US 2004/0012985 A1 Jan. 22, 2004

Related U.S. Application Data

(63) Continuation-in-part of application No. 10/316,248, filed on Dec. 10, 2002.
(60) Provisional application No. 60/361,908, filed on Mar. 1, 2002, and provisional application No. 60/339,308, filed on Dec. 12, 2001.

(51) Int. Cl.[7] .......................................... H02M 7/5387
(52) U.S. Cl. ......................................... 363/98; 363/17
(58) Field of Search ............................. 363/17, 95, 97, 363/98

(56) References Cited

U.S. PATENT DOCUMENTS

| | | | |
|---|---|---|---|
| 4,535,399 A | 8/1985 | Szepesi | 363/41 |
| 4,700,285 A | 10/1987 | Szepesi | 363/97 |
| 4,797,803 A | 1/1989 | Carroll | 363/95 |
| 4,855,888 A * | 8/1989 | Henze et al. | 363/17 |
| 5,029,064 A * | 7/1991 | Ball | 363/65 |
| 5,032,972 A * | 7/1991 | Erckert | 363/97 |
| 5,053,937 A | 10/1991 | Blockl | 363/16 |
| 5,065,300 A * | 11/1991 | Jacobson et al. | 363/16 |
| 5,109,185 A * | 4/1992 | Ball | 323/207 |
| 5,151,852 A * | 9/1992 | Jacobson et al. | 363/131 |
| 5,159,544 A | 10/1992 | Hughey et al. | 363/97 |
| 5,208,740 A * | 5/1993 | Ehsani | 363/124 |
| 5,248,866 A | 9/1993 | Tanaka et al. | 219/10.77 |
| 5,291,384 A * | 3/1994 | Mammano et al. | 363/17 |
| 5,486,993 A | 1/1996 | Sakurai et al. | 363/98 |
| 5,646,835 A * | 7/1997 | Katcha | 363/98 |
| 5,781,418 A * | 7/1998 | Chang et al. | 363/16 |
| 6,009,007 A | 12/1999 | Pan | 363/17 |
| 6,011,708 A * | 1/2000 | Doht et al. | 363/98 |
| 6,016,257 A * | 1/2000 | Chang et al. | 363/17 |
| 6,807,070 B2 * | 10/2004 | Ribarich | 363/17 |

* cited by examiner

*Primary Examiner*—Jeffrey Sterrett
(74) *Attorney, Agent, or Firm*—Ostrolenk, Faber, Gerb & Soffen, LLP

(57) ABSTRACT

A phase delay control for a power converter operates with a phase locked loop and current sense feedback to provide improved control stability and dynamic output range. The phase lock loop includes a voltage controlled oscillator that is controlled based on an error signal derived from a phase of the power converter output. The error signal applied to the voltage controlled oscillator produces a shift in switching frequency for the converter to drive the error to zero. The power converter includes an LCC resonant circuit to manipulate resonant electrical energy to improve switching speed and power density.

23 Claims, 30 Drawing Sheets

PRIOR ART

Parallel resonant converter

LCC resonant converter

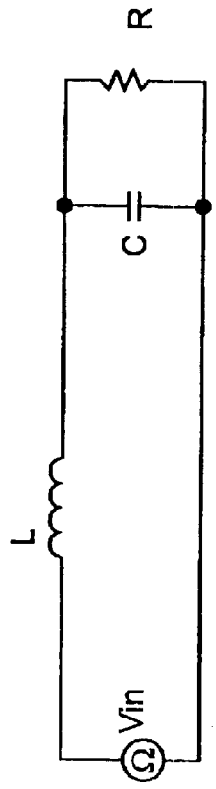

Resonant frequency: $\omega_0 = \dfrac{1}{\sqrt{LC}}$

Characteristic impedance: $Z_0 = \sqrt{\dfrac{L}{C}}$

Load quality factor: $Q_L = \dfrac{R}{Z_0}$ the phase angle (degree): $\psi = -\dfrac{180}{\pi}\arctan\left\{Q_L\left(\dfrac{\omega}{\omega_0}\right)\left[\left(\dfrac{\omega}{\omega_0}\right)^2 + \dfrac{1}{Q_L^2} - 1\right]\right\}$ the voltage on the resistor R: $V_R = \dfrac{\sqrt{2}V_{rms}}{1-\left(\dfrac{\omega}{\omega_0}\right)^2 + j\dfrac{1}{Q_L}\left(\dfrac{\omega}{\omega_0}\right)} = \dfrac{\sqrt{2}(0.4502V_{in})}{1-\left(\dfrac{\omega}{\omega_0}\right)^2 + j\dfrac{1}{Q_L}\left(\dfrac{\omega}{\omega_0}\right)}$ the output power: $P_R = \dfrac{|V_R|^2}{R}$

FIGURE 7   PRIOR ART

RESONANT CONVERTER WITH PHASE DELAY CONTROL

RELATED APPLICATIONS

This application is based on and claims priority to U.S. Provisional Application No. 60/361,908, filed on Mar. 1, 2002, by Thomas Ribarich, entitled Resonant Mode Controller IC. and is a continuation-in-part application of application Ser. No. 10/316,248, filed Dec. 10, 2002, entitled Resonant Converter With Phase Delay Control, and is based on and claims benefit of U.S. Provisional Application No. 60/339,308, filed Dec. 12, 2001, entitled Resonant Converter With Phase Delay Control, to which a claim of priority is hereby made. The subject matter and disclosure of both applications being incorporated herein.

BACKGROUND OF THE INVENTION

1. Field of the Invention

The present invention relates generally to resonant power converters, and relates more particularly to resonant power converters that are controlled with a phase delay control configuration.

2. Description of the Related Art

Many types of power converters are well known, in particular pulse width modulation (PWM) converters and resonant power converters. PWM power converters operate by providing a pulse train, where the pulse width is adjusted according to the desired power to be supplied. PWM converters can typically switch at frequencies that provide increased efficiency, to permit a size reduction for the magnetic components, leading to smaller packaging. Typically, however, higher frequency switching in PWM converters results in increased switching losses and greater electromagnetic interference (EMI) being produced. Typically, the switching losses occur because the switches are controlled to switch while conducting a current or bearing a voltage, resulting in "hard switching." The hard switching losses in a typical PWM converter tend to increase with the switching frequency. In addition, the EMI generated by hard switching, especially at high frequencies, can become a major factor that affects the efficiency of an input power supply through a reduced power factor.

To overcome the difficulties associated with hard switching in PWM converters, resonant converters have been used that have oscillatory waveforms that permit "soft switching," where either the current or voltage carried by a switch is close to zero. In particular, the switches in a resonant converter can turn on with zero current and turn off with zero voltage. The reduced switching losses and simplicity of implementation permits resonant converters to operate at typically much higher frequencies than is practical with PWM converters. Accordingly, a typical resonant converter can provide a great deal of efficiency with a high power density. In addition, the oscillatory nature of the input in a resonant converter permits a control scheme to shape the input current to match that of the voltage, resulting in a high power factor. A desired power output from a resonant converter is typically controlled by changing the switching frequency to regulate the output voltage. A typical series resonant inverter is illustrated in FIG. 1, using a half bridge switching configuration in which the switches are operated complementary with regard to switching ON and OFF.

Resonant converters can be operated in a number of modes, including conductive, capacitive and resistive. FIG. 2 illustrates operational waveforms for an inductive mode of operation of the resonant converter depicted in FIG. 1. FIG. 3 illustrates operational waveforms for a capacitive mode of operation for the resonant converter depicted in FIG. 1. FIG. 4 illustrates the operational waveforms for a resistive mode of operation of the resonant converter depicted in FIG. 1.

Referring to FIG. 3, the capacitive mode of operation shows a decreased switching frequency that is lower than that of the resonant frequency for the circuit. In the capacitive mode, the body diodes of the MOSFET switches reverse recover with significant losses. Accordingly, it is preferred that the resonant converter operates at frequencies greater than the resonant frequency of the circuit to minimize these losses.

When the resonant converter is operating in resistive mode, the operation frequency is close to the resonant frequency, and thus obtains a high degree of efficiency. In this instance, the voltage and current sinusoidal waveforms have nearly the same phase, resulting in a high power factor and less energy dissipated in circulating voltages and currents. However, the operation frequency of the resonant converter must be maintained when exposed to varying loads, to continue to obtain high efficiency and a good power factor correction.

Various topologies are used in resonant converters to obtain various desired results. For example, FIG. 5 illustrates a parallel resonant converter, while FIG. 6 illustrates an LCC resonant converter. In FIG. 5, capacitor $C_P$ is the only resonant capacitor, as capacitors $C_{in/2}$ act as voltage dividers for the input DC voltage. In FIG. 6, both capacitors $C_P$ and capacitors $C_{s/2}$ act as resonant capacitors.

Operational characteristics vary among the topologies of the resonant converters described above. For example, the series resonant converter illustrated in FIG. 1 can operate in an open circuit mode, but not in a short circuit mode. The parallel resonant converter illustrated in FIG. 5 can operate in a short circuit mode, but not in an open circuit mode. The LCC resonant converter illustrated in FIG. 6, cannot operate in either short circuit or open circuit modes, and therefore preferably includes open and short circuit protection in practical operation. However, the LCC resonant converter has an increased overall efficiency and available output load range. The increased range and efficiency results from a decreased circulating current with a decreased load, so that an overall high efficiency range is maintained.

In the resonant converters described above, output voltage is typically maintained and regulated as a function of switching frequency. An increase in the switching frequency permits greater power to be delivered to the load, thereby permitting an increased power output. However, this type of control can result in resonant currents and voltages that have high peak values, which leads to increased conduction losses as well as increased rating requirements for the power devices. In addition, variable switching frequency control typically makes the overall control more complicated, as well as adding to the complexity of filter design for the converter. This type of control typically relies on feedback from the output to regulate the switching frequency and maintain the desired power output level. However, the relationship between the output power and switching frequency is typically very non-linear, adding to the difficulty of realizing a robust control for the resonant power converter.

SUMMARY OF THE INVENTION

According to the present invention, a resonant power converter is provided that is controlled using a phase delay control to obtain improved feedback control while maintaining high efficiency. The resonant converter of the present invention can obtain high switching frequency, resulting in reduced component sizes, while limiting current or voltage surges experienced by the resonant converter components.

The phase delay control incorporates a phase lock loop (PLL) to track the phase of an inductor in the resonant power converter against a reference phase signal. The phase delay is regulated by obtaining an error signal representing the difference between the phase of the output stage current and the reference phase signal. The error signal is supplied to a voltage controlled oscillator (VCO) to modify the operation frequency appropriate for the transfer function of the output stage. The change in operational frequency tends to reduce the phase delay error signal to zero, resulting in a robust and simplified control.

The present invention utilizes an integrated circuit (IC) that can be used to control a lamp ballast circuit, to obtain the desired control characteristics in a simplified approach. The operational characteristics of the IC are modified through selection of components and IC functions to implement the phase delay control. Alternatively, the control may be realized through an IC specific to power converters. The result is a phase delay control with improved operating characteristics that can be implemented simply with available components.

DESCRIPTION OF THE DRAWINGS

The present invention is described in greater detail in the following description, with reference to the accompanying drawings, in which:

FIG. 7 illustrates circuit parameters for an ideal resonant circuit;

DETAILED DESCRIPTION OF THE PREFERRED EMBODIMENTS

The present invention provides a resonant converter with a phase delay control implemented in an IC to obtain high efficiency and broad output range while reducing EMI. The phase delay control is implemented with a feedback arrangement that provides a current sense to determine a phase angle error measurement. The phase angle error measurement, derived from a comparison with a reference phase angle, is used to control a VCO that can modify a switching frequency to adjust the phase angle of the resonant tank voltage and current.

Figure 1:
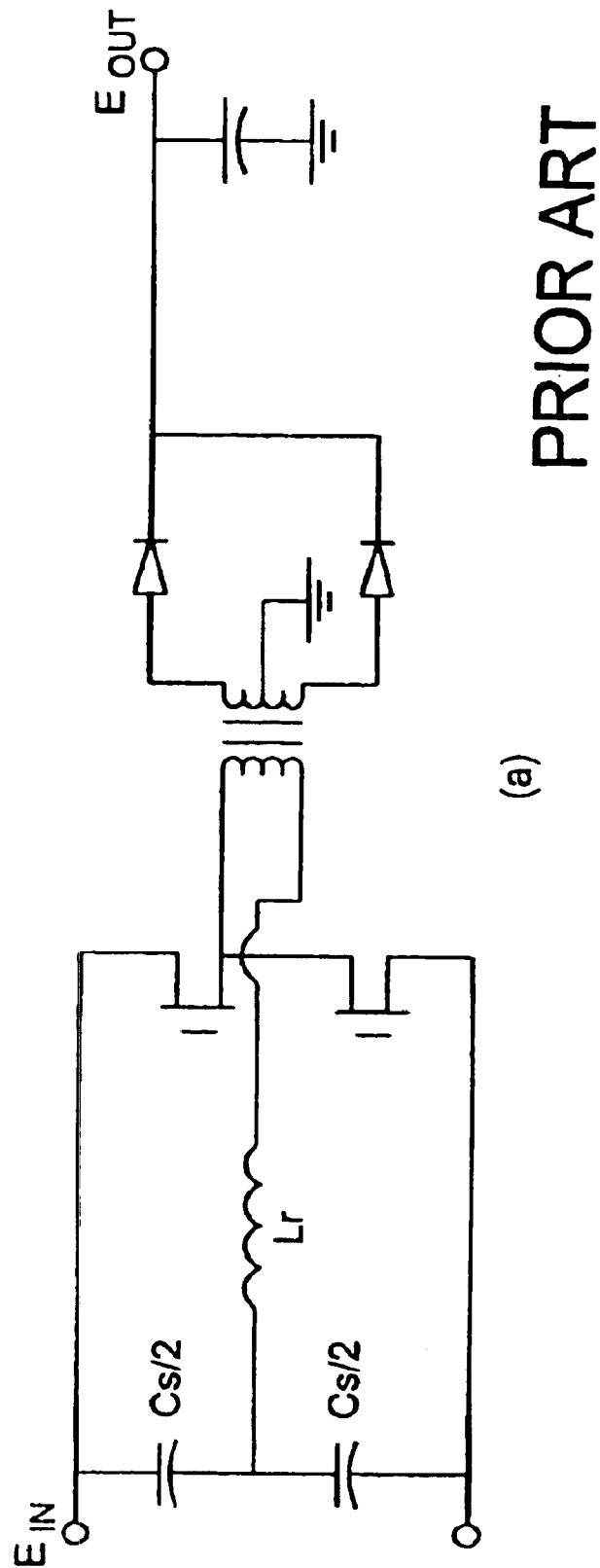
FIG. 1 shows a conventional series resonant converter.
Figure 2:
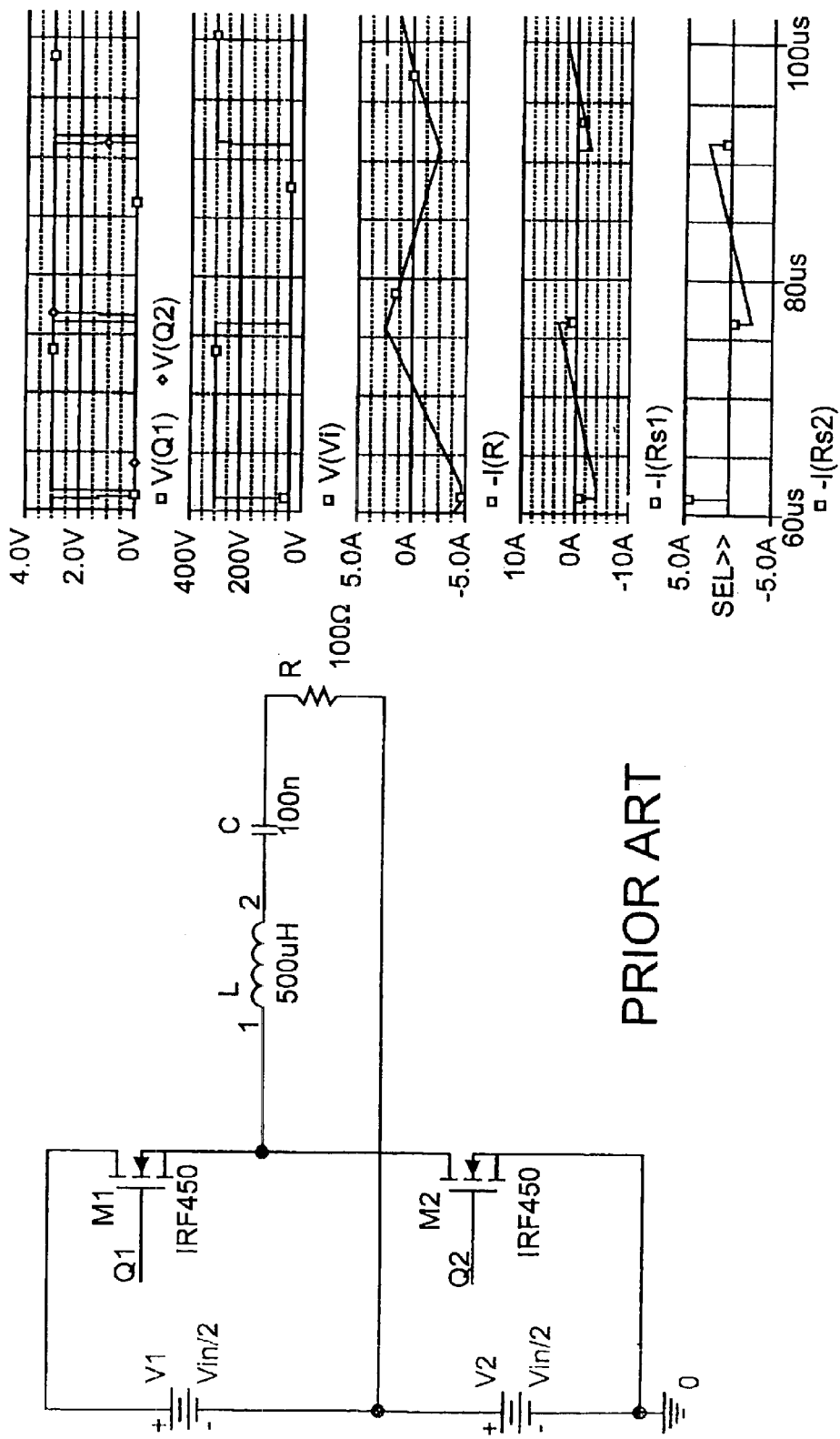
FIG. 2 shows operational waveforms for the circuit of FIG. 1 in an inductive mode.
Figure 3:
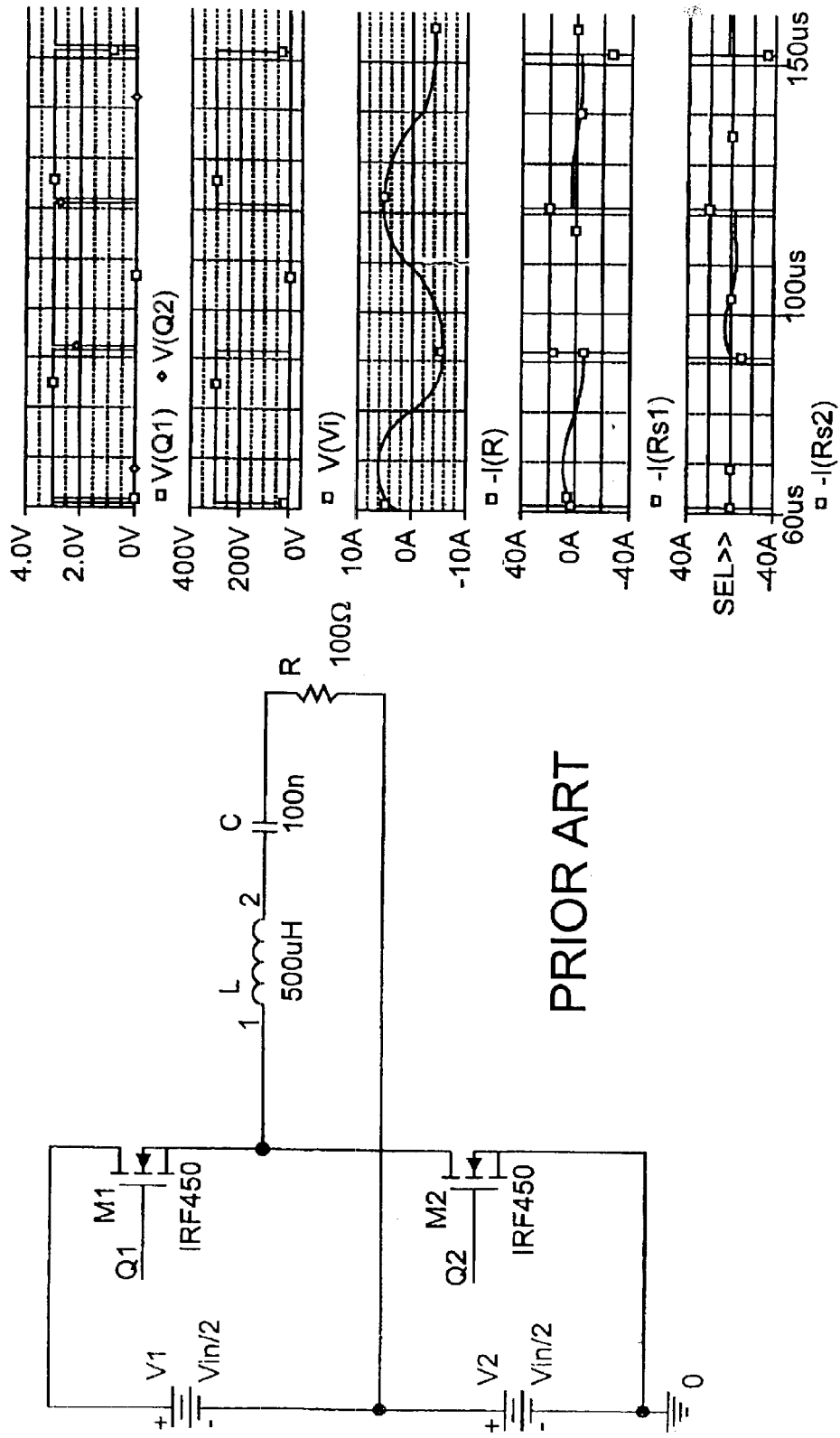
FIG. 3 shows operational waveforms for the circuit of FIG. 1 operated in a capacitive mode.
Figure 4:
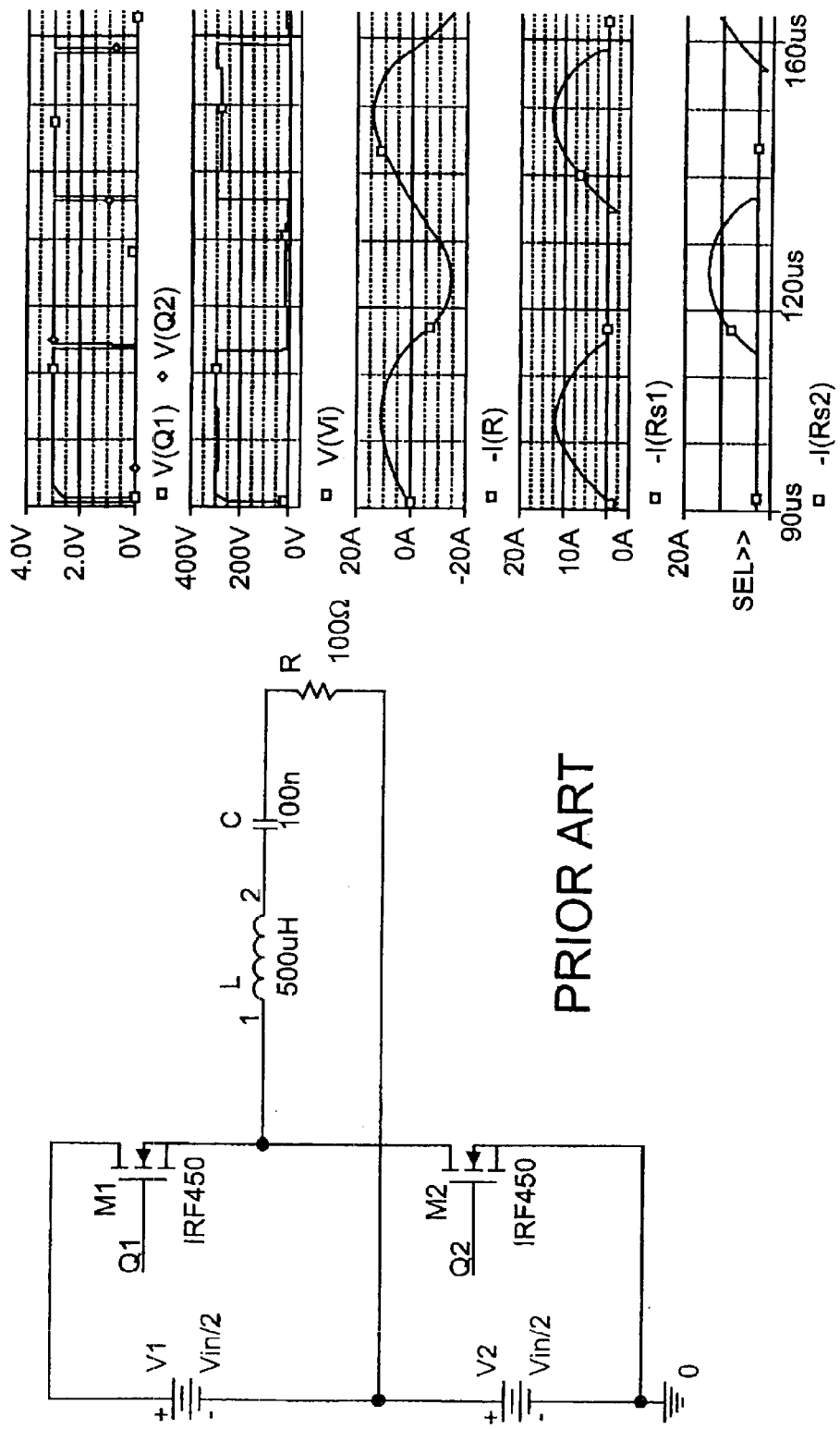
FIG. 4 shows operational waveforms for the circuit of FIG. 1 operated in a resistive mode.
Figure 5:
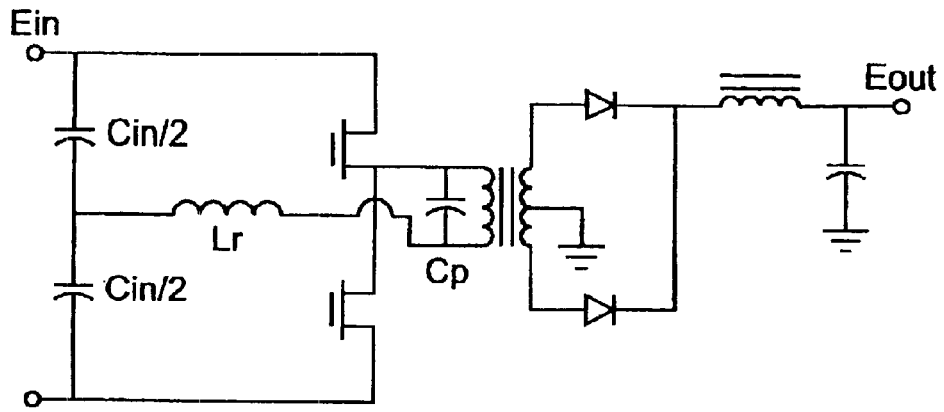
FIG. 5 shows a conventional parallel resonant converter.
Figure 6:
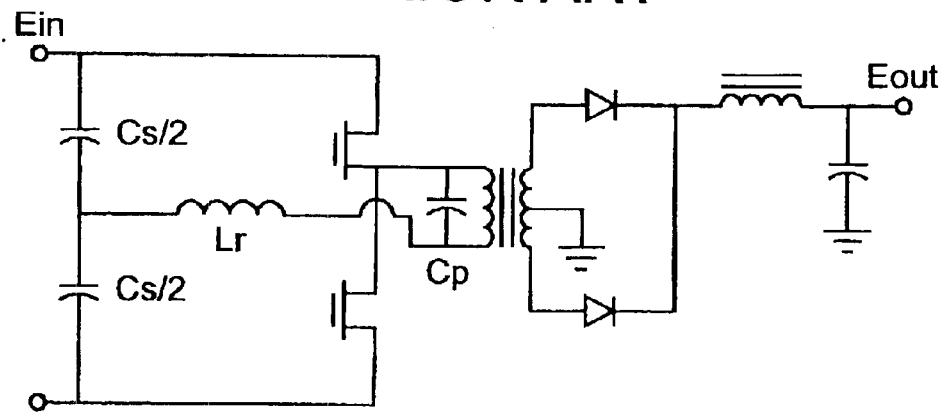
FIG. 6 shows a conventional LCC resonant converter.
Figure 8:
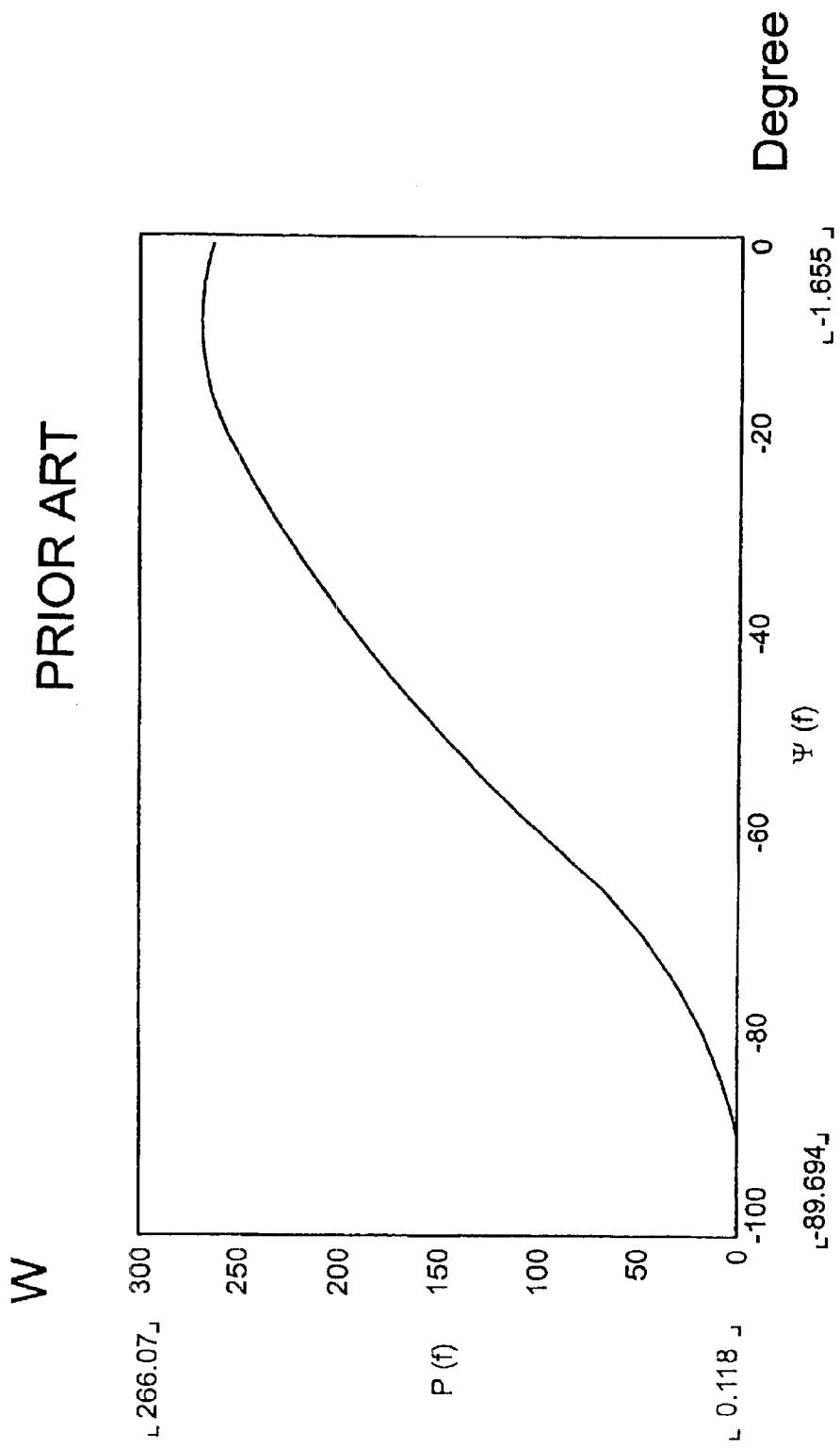
FIG. 8 is a graph illustrating the relationship between phase angle and output power for the circuit of FIG. 5.
Figure 9:
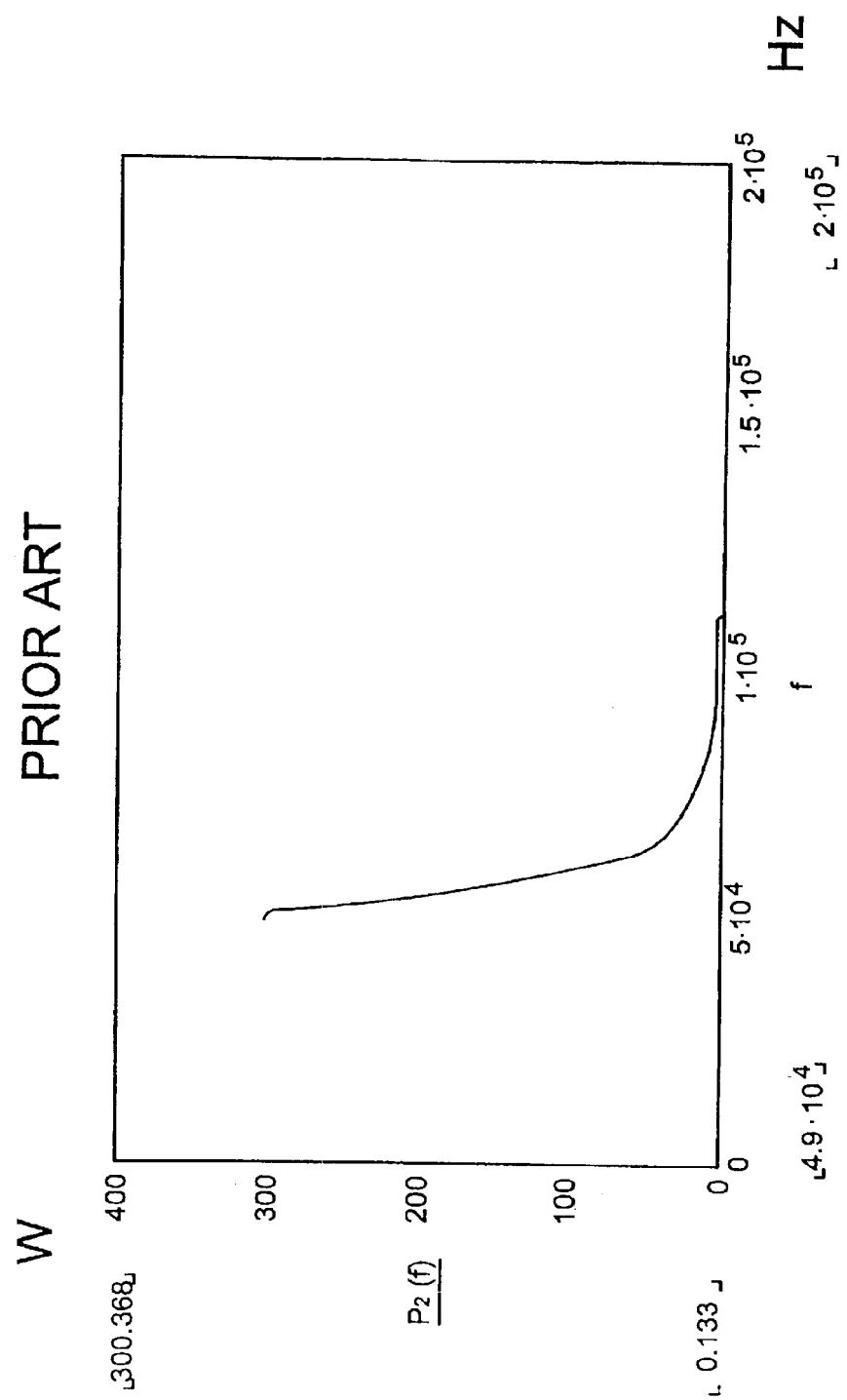
FIG. 9 is a graph of switching frequency versus power output for the circuit of FIG. 5.
Figure 10:
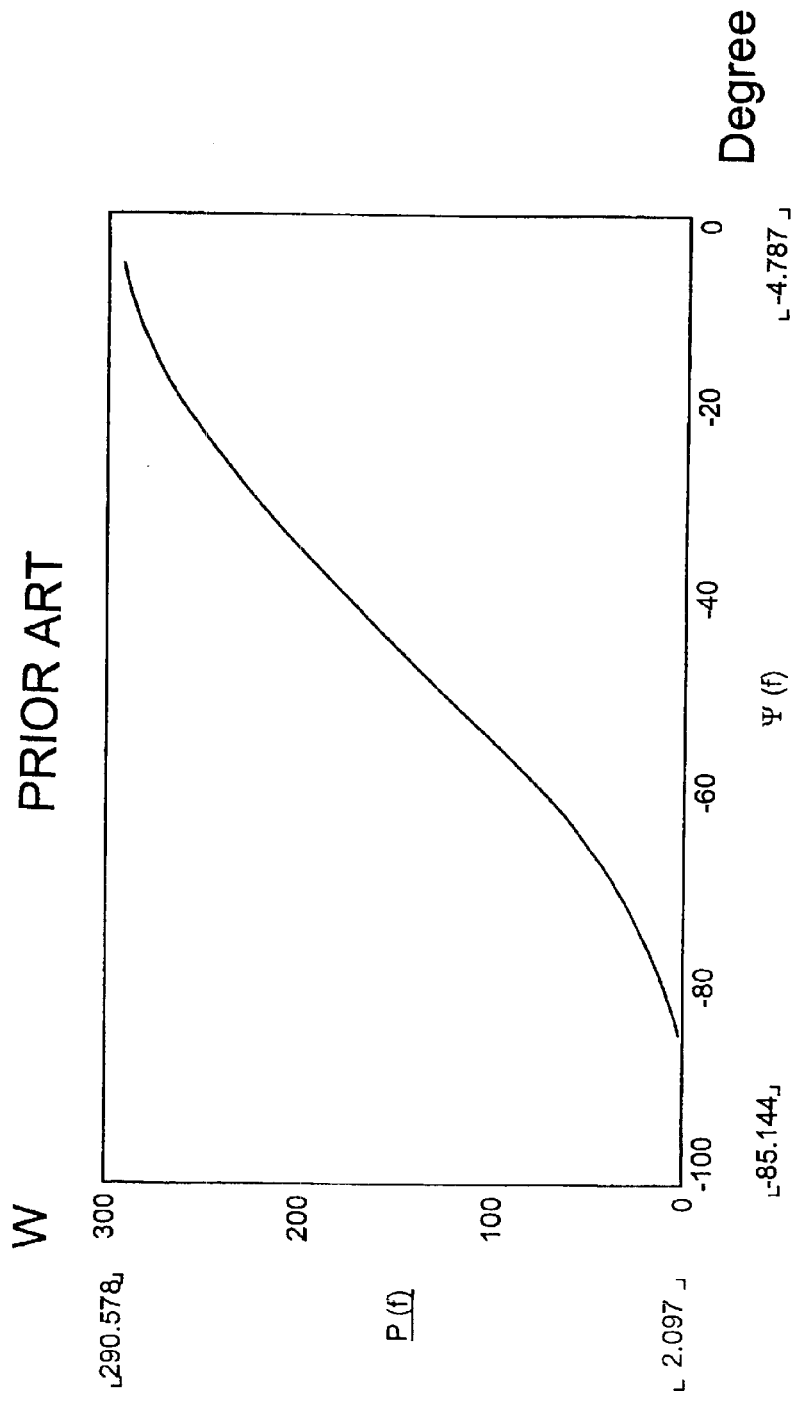
FIG. 10 is a graph illustrating phase angle versus power output for the circuit of FIG. 1.
Figure 11:
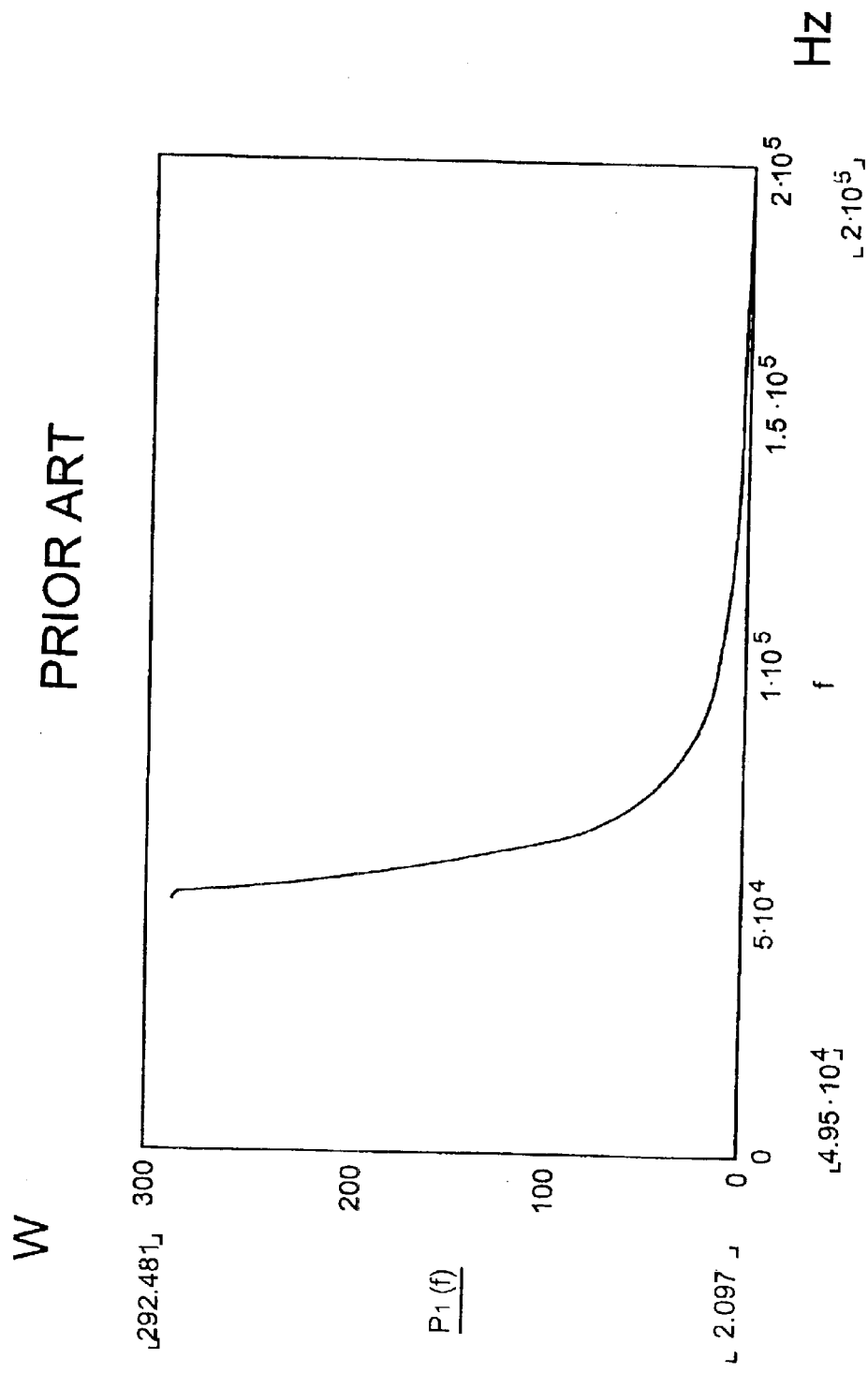
FIG. 11 is a graph illustrating switching frequency versus output power for the circuit of FIG. 1.
Figure 12:
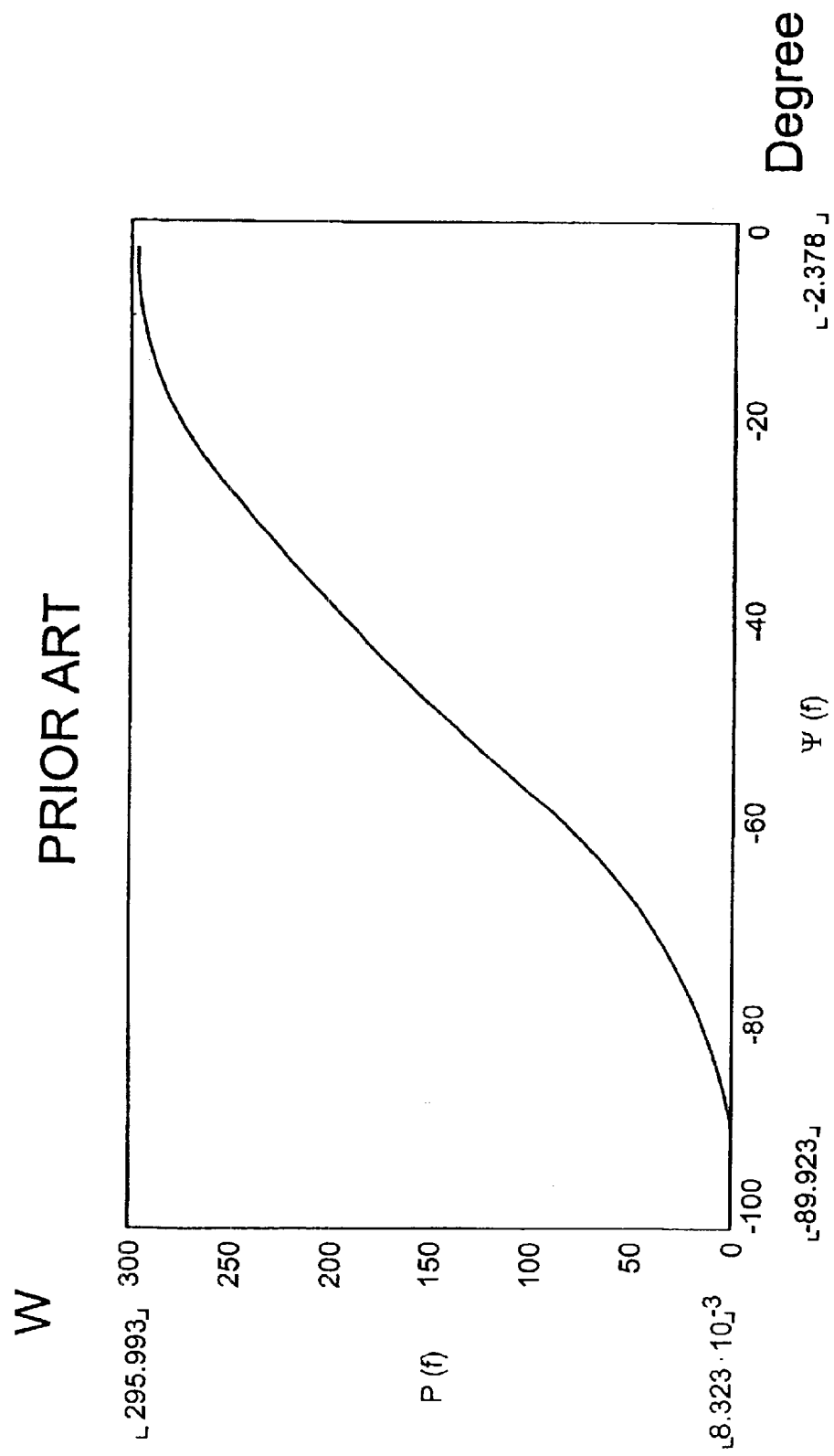
FIG. 12 is a graph illustrating phase angle versus output power for the circuit of FIG. 6.
Figure 13:
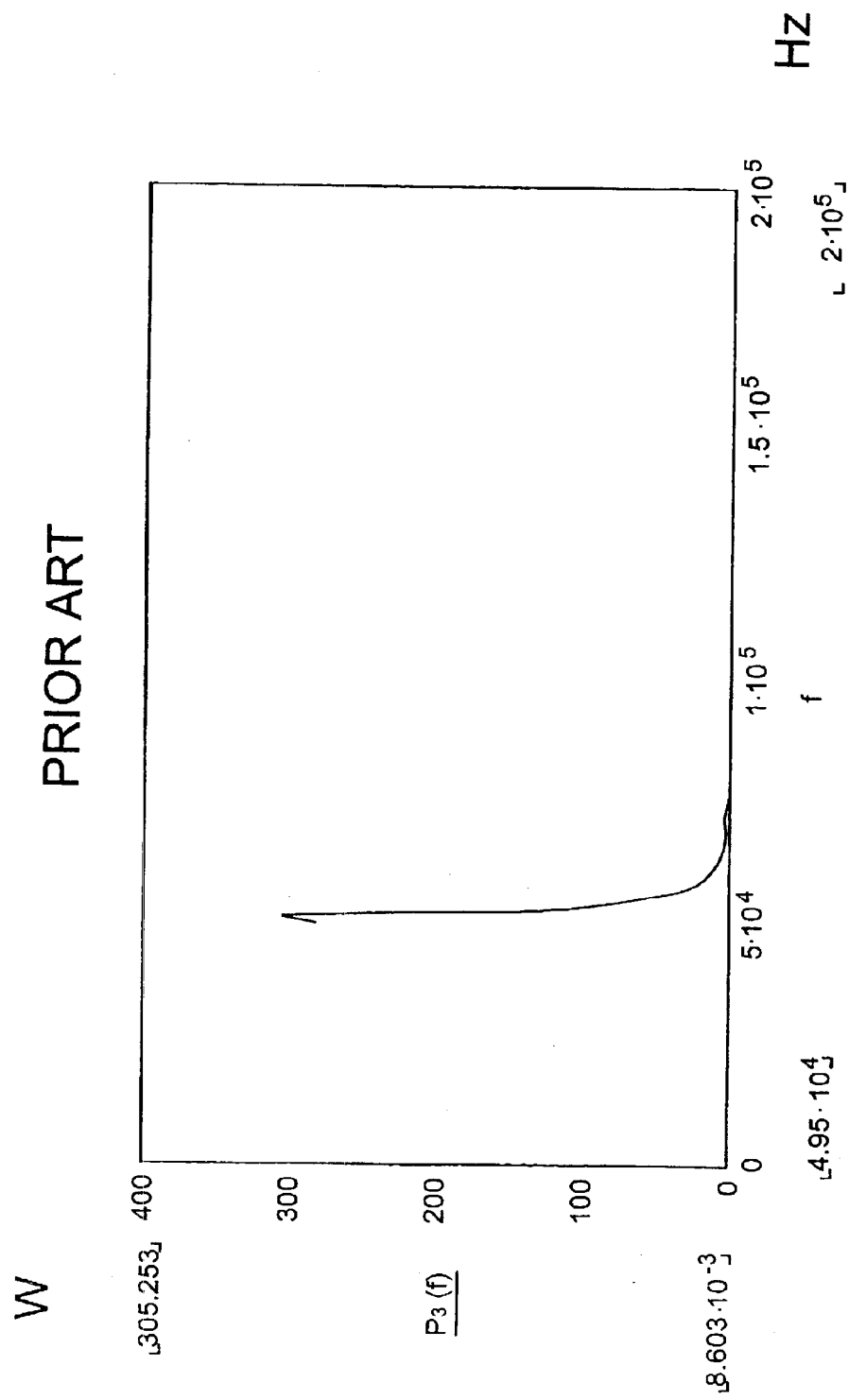
FIG. 13 is a graph illustrating switching frequency versus output power for the circuit of FIG. 6.

Referring to FIGS. 8–13, graphical illustrations of the relationship between power output, switching frequency and phase angle are provided for series, parallel and LCC resonant converters. In FIGS. 8, 10 and 12, the relationship between the output power and phase angle is substantially linear over a broad range of phase angles for each of the several types of resonant converters. In contrast, however, FIGS. 9, 11 and 13 illustrate that the power output relationship with switching frequency is substantially non-linear and provides a relatively small dynamic range suitable for feedback control. Accordingly, a comparison of phase angle control and frequency control for the resonant converter clearly illustrates the advantages of phase angle control using a feedback configuration to control the output power.

Referring to FIG. 7, a resonant circuit model is illustrated with the derivation of various operational parameters for the circuit. In particular, the phase angle as a function of frequency is described. This equation to obtain the phase angle for the various types of resonant converters is substantially linear over a broad range of output power for the circuit. Note that FIG. 7 indicates output power is defined as the magnitude of the output voltage squared over the output resistance. Accordingly, output power varies as a function of output voltage, which varies as a function of switching frequency. This relationship is illustrated in FIGS. 9, 11 and 13.

Figure 14:
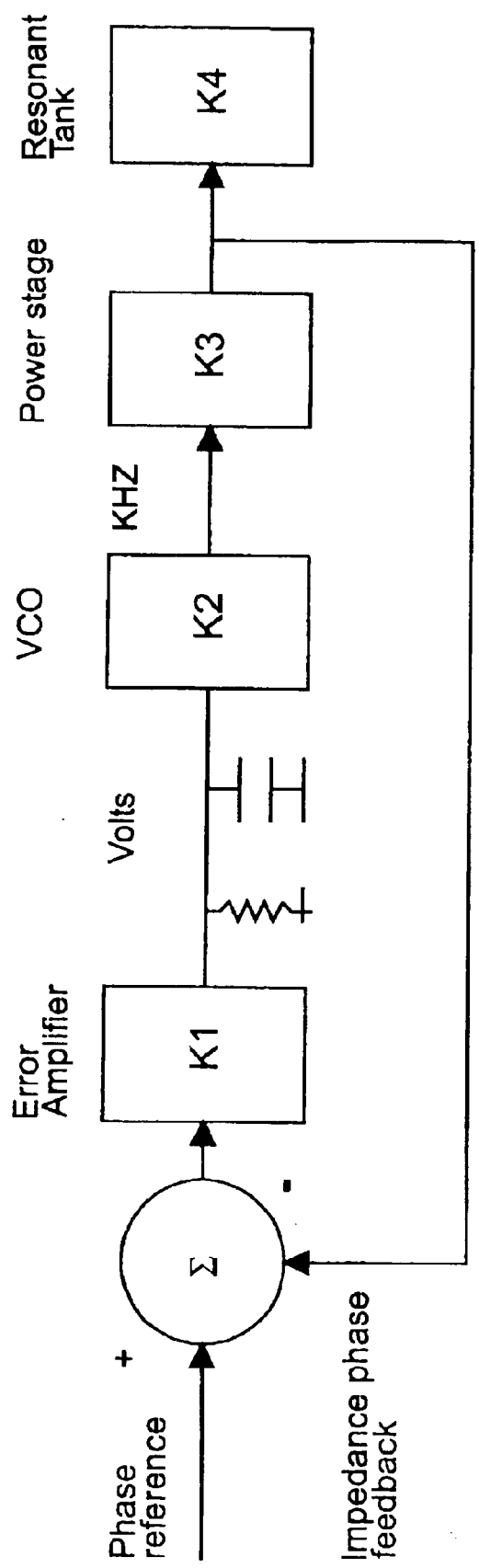
FIG. 14 is a block diagram of a phase delay control according to the present invention.

Referring now to FIG. 14, a block diagram of the phase delay control according to the present invention is illustrated. The control uses a phase angle reference value that is summed with a feedback phase angle value from the power control output. The difference between the phase angle reference and the phase angle feedback provides an error value indicating the difference between the desired phase and the actual phase. The summing junction can be implemented as a comparison function in the alternative.

The error value for the phase delay is amplified and input to a VCO to generate an oscillatory signal with a specified frequency related to the VCO input. The oscillatory output is provided to the power control stage of the power converter, and the phase of the power control output signal is adjusted accordingly. The power control output is shown connected to a resonant tank circuit, which also has an impact on the phase angle feedback signal. Accordingly, the PLL described in FIG. 14 can provide a soft switching control arrangement for a resonant power converter based on phase delay control.

Figure 15:
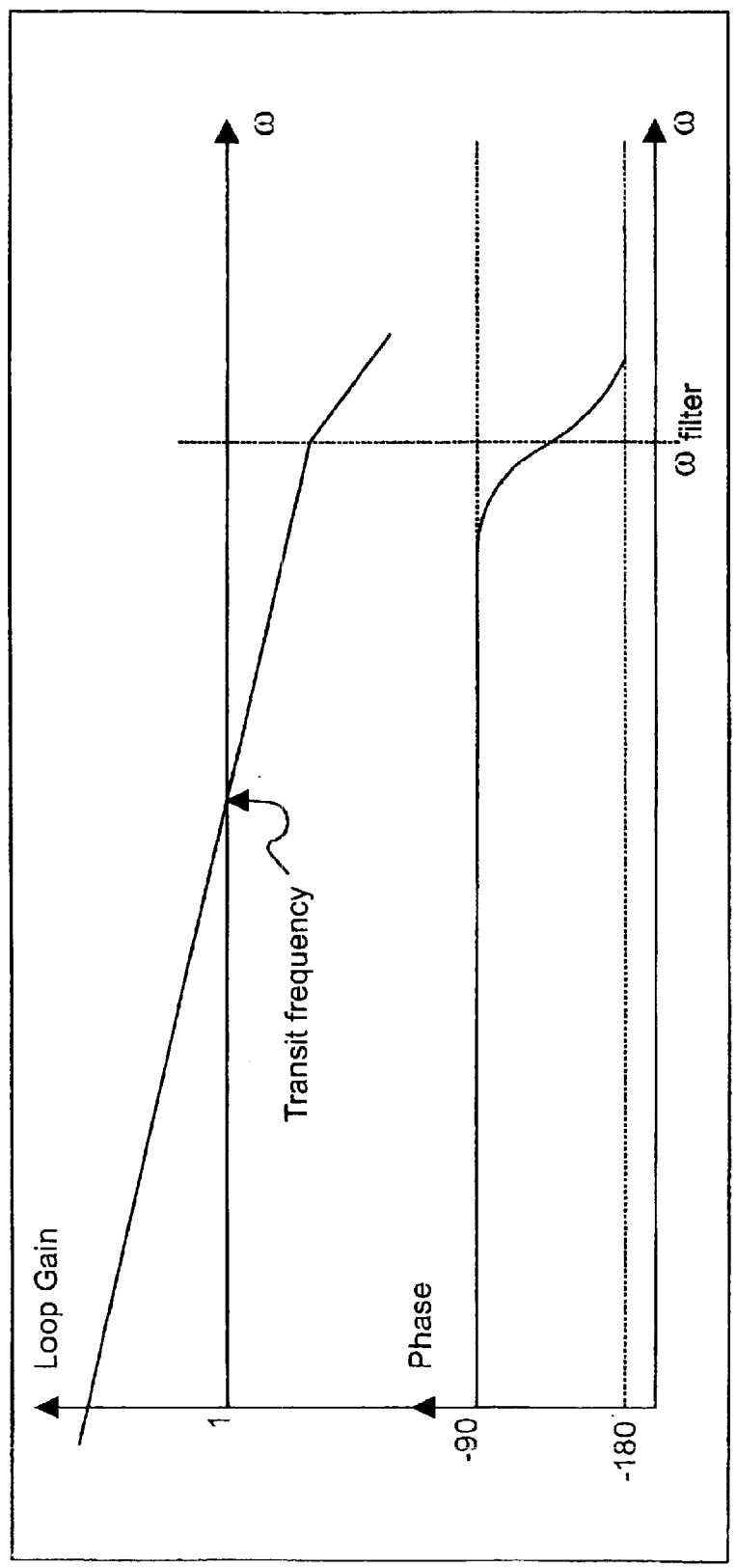
FIG. 15 is a graph illustrating frequency response for a phase delay control system.

Referring to FIG. 15, an open loop frequency response for the resonant converter with a phase delay control and a given power output is illustrated. The open loop frequency response indicates a 20 dB/dec decrease in gain due to the open loop integration characteristics of the system. The closed loop gain, showing a pole at the filter frequency, decreases by another 20 dB/dec.

Figure 16:
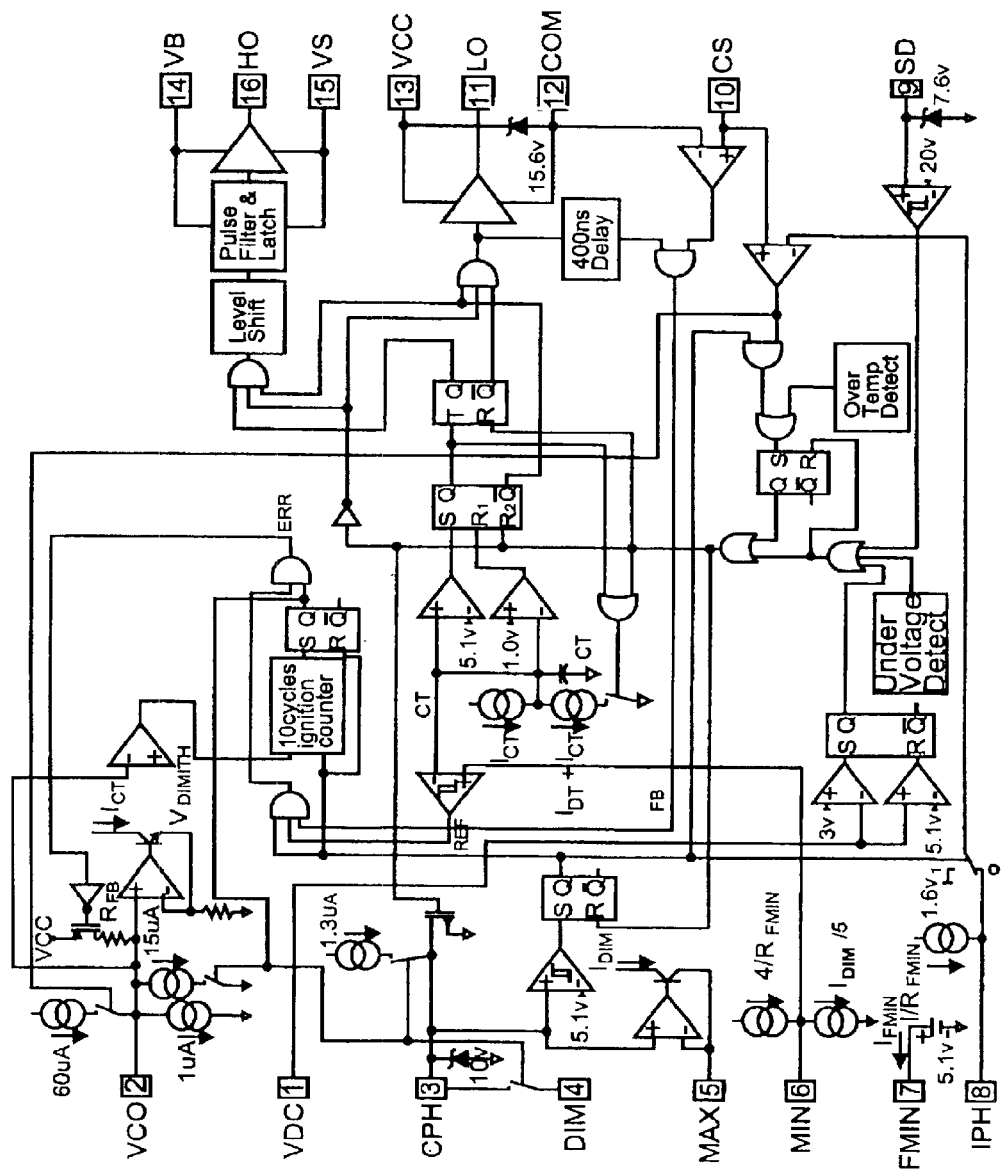
FIG. 16 is a block diagram illustrating the internal circuitry of an IC used to implement the phase delay control according to the present invention.

Referring now to FIG. 16, a block diagram of the phase delay control as realized on an IC according to one embodiment of the present invention is illustrated. This IC block diagram is disclosed in U.S. Pat. No. 6,008,593, the disclosure of which is hereby incorporated by reference. The design of the IC circuit is for a lamp ballast, but contains features and functions that can be used to realize the phase delay control for a resonant converter according to the present invention. For example, the IC includes a VCO input on pin 2, along with a current sense input on pin 10 to realize the PLL phase delay control according to the present invention.

Figure 17:
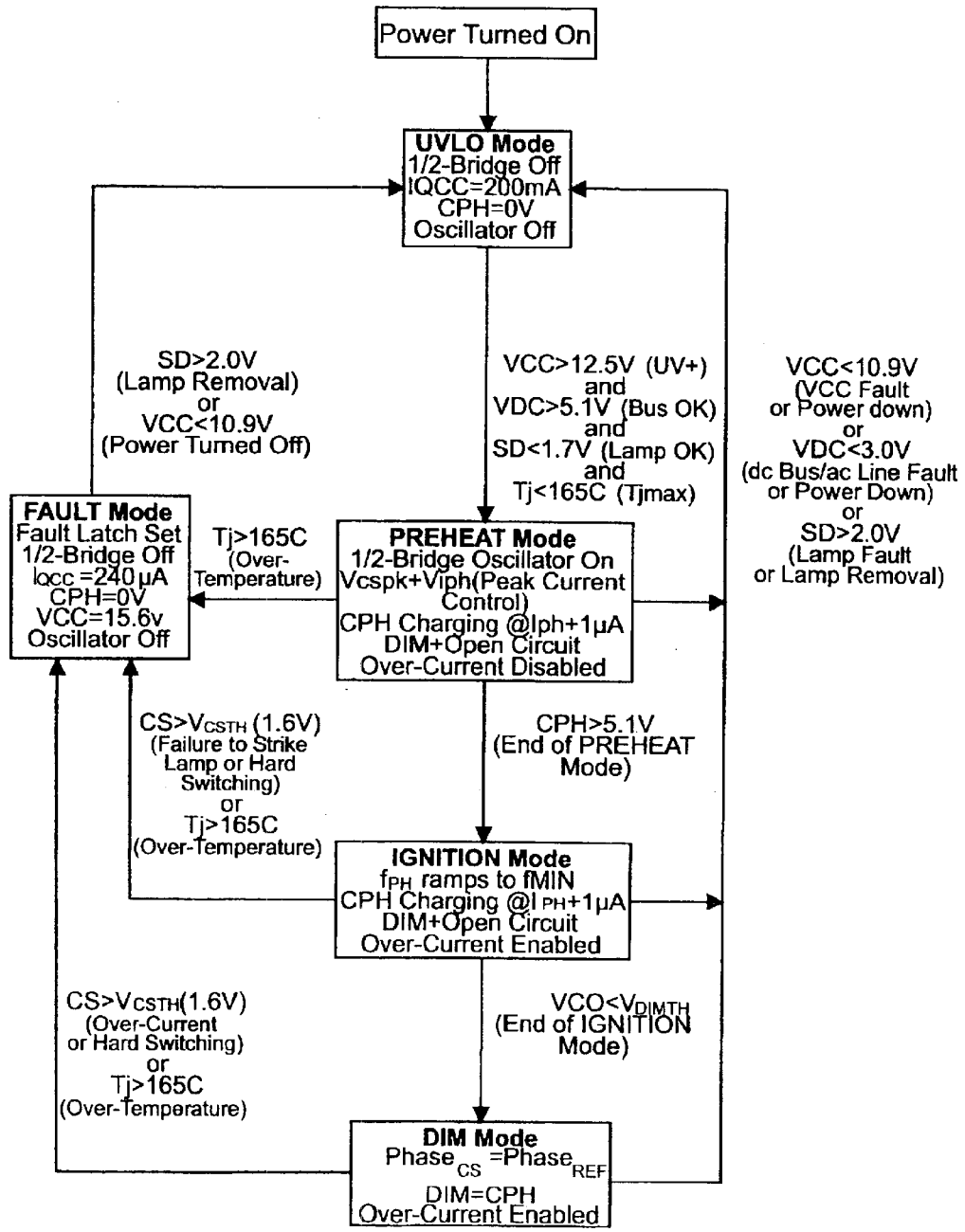
FIG. 17 is a state diagram illustrating the operation modes of the circuit in FIG. 16.

Referring to FIG. 17, a diagram illustrating the state operation of the IC for a lamp ballast control shown in FIG. 16 is illustrated. In the present invention, the preheat and ignition modes are unnecessary and can be selectively eliminated using externally connected circuitry. As illustrated in the state diagram, the IC provides an under voltage lockout mode to insure proper input voltage for correct operation. In addition, the IC provides an overcurrent and an over temperature protection, as well as detection of hard switching. If the IC detects any of these or other faults, the outputs for driving the two half bridge switches are forced to an OFF, or safety, value.

Figure 18:
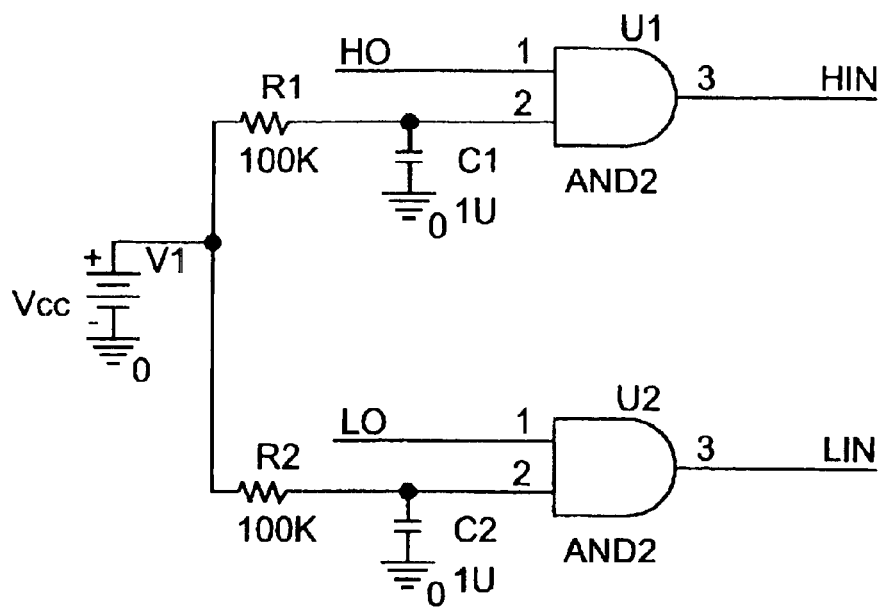
FIG. 18 is a circuit for use with the IC illustrated in FIG. 16 to select functions implemented by the IC.

Referring to FIG. 18, a selective delay circuit externally connected to the IC circuit of FIG. 16 is illustrated. The inputs to the two AND gates are the drive signals output from the IC, HO and LO. The circuit illustrated in FIG. 18 provides a delay mechanism so that the driver outputs during preheat and ignition mode have no impact on the operation of the resonant converter.

Figure 19:
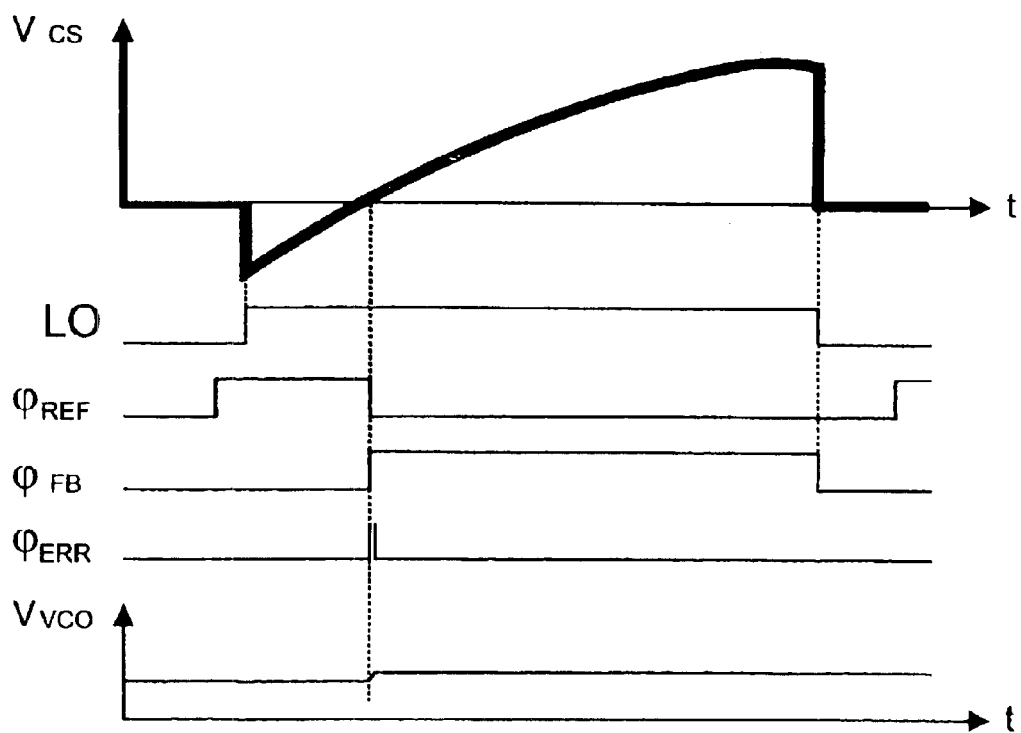
FIG. 19 is a timing diagram illustrating the operation of the phase delay control according to the present invention.

FIG. 19 provides an illustration of how the phase delay control operates. The illustrated timing diagrams show the phase reference, phase feedback and phase error signals. In this illustration, the phase feedback is slightly out of alignment with the phase reference, as determined by the zero crossing of the current sense voltage $V_{CS}$. The difference in phase generates a phase error signal that appears as a short spike, the duration of which indicates the phase error. The phase error signal is input into the voltage controlled oscillator, which is illustrated as having a voltage that increases slightly due to the phase error difference. The VCO output in turn adjusts the frequency of the resonant converter to drive the phase angle error to zero.

Figure 20:
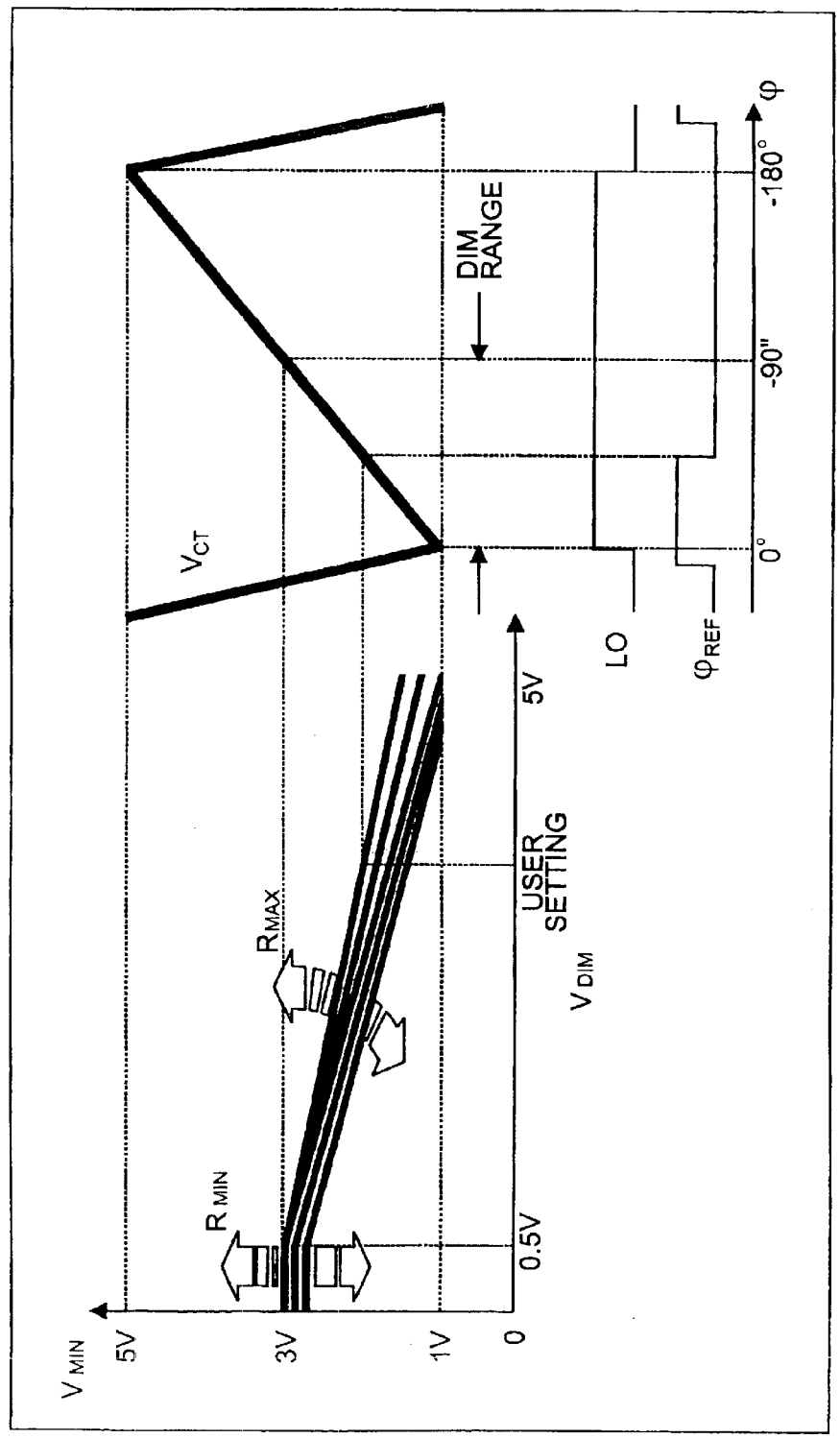
FIG. 20 is a set of graphs illustrating operational characteristics of the phase delay control utilizing the IC according to the present invention.

Referring now to FIG. 20, a range of operation for the phase delay control is programmable through pins MIN and MAX illustrated in FIG. 16. An external resistor on pin MAX sets the maximum output power for the resonant converter. The maximum output range corresponds to 5 volts on pin DIM. Similarly, an external resistor coupled to pin MIN sets the maximum phase shift, or minimum output power for the resonant converter. The minimum output power for the resonant converter corresponds to 0.5 volts on pin DIM, as illustrated in FIG. 20. These programmable ranges permit the user to set the reference phase angle in the range of 0 to −90°, as illustrated in FIG. 20. The phase angle range of from 0 to −90° corresponds to bounded voltage on pin MIN between 1 and 3 volts. This feature, using the dimming function of the IC circuit, permits the user to set the reference phase angle to achieve a specified power output.

Figure 21:
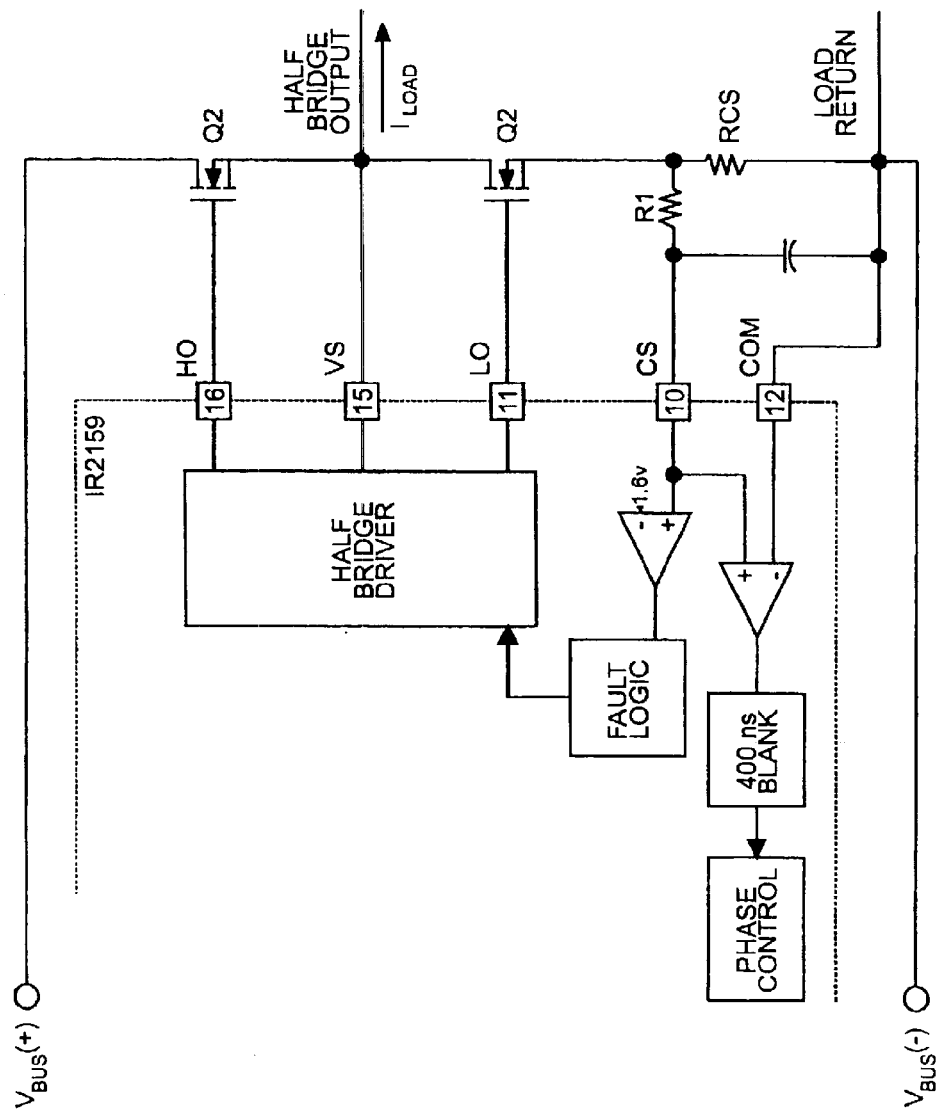
FIG. 21 is a current sense circuit implemented using the IC.
Figure 22:
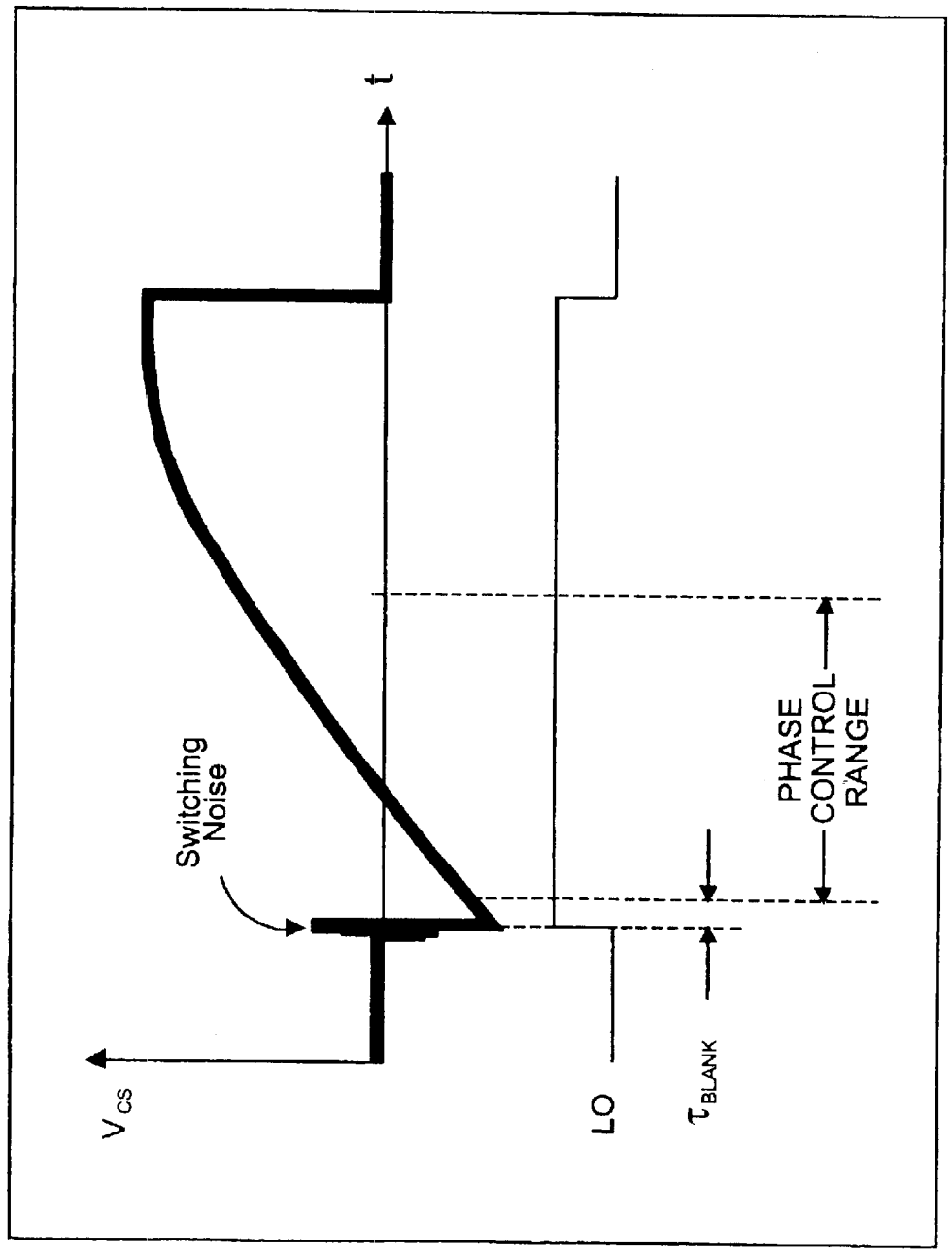
FIG. 22 is a graph illustrating a current sense blanking period.

Referring now to FIG. 21, a current sense circuit according to the present invention is illustrated. A current sense resistor RCS is used to derive a signal on pin CS, which can be used to detect zero crossings and over current conditions. The over current detection results in a fault indication that will place the half bridge driver in a safety shutdown mode. The safety shutdown mode persists, for example, until the over current condition is removed for a specified period of time, or until power to the circuit is cycled. The current sense signal is compared to a common signal reference on pin COM to determine a zero crossing. It is a zero crossing that is used to determine the feedback phase angle discussed above and as illustrated in FIG. 19. As shown in FIGS. 19 and 22, the feedback phase angle is obtained during the interval when the low side switch of the half bridge, driven by signal LO, is high. During this interval, the voltage on pin CS experiences a zero crossing that provides an indication of the phase angle to control the resonant circuit.

Referring to FIG. 22, when the low side switch is driven ON by signal LO going high, a voltage transient appears on pin CS due to switching noise produced by the low side switch being turned on. To avoid erroneous measurements of the zero crossing of voltage $V_{CS}$, a measurement delay period of 400 nanoseconds is introduced to the transient circuitry, as illustrated in FIGS. 21 and 22.

Figure 23:
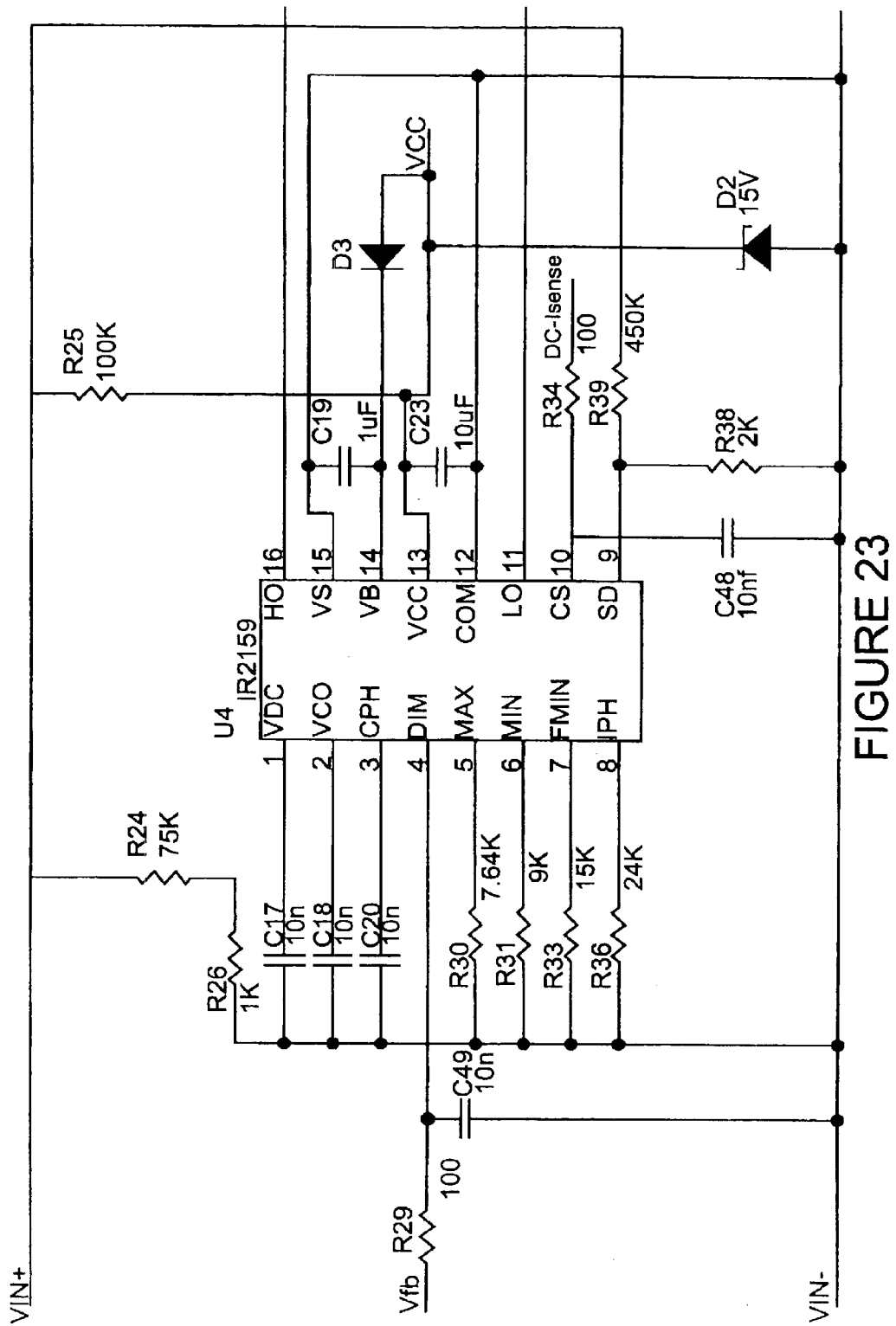
FIG. 23 is a circuit diagram showing component connection to the IC to realize the present invention.

Referring now to FIG. 23, external circuitry connected to the IC implementing the phase delay control with an LCC resonant converter topology is illustrated. The LCC resonant converter topology is preferred to take advantage of the attendant efficiencies and load range provided with this resonant circuit configuration. The circuit illustrated in FIG. 23 also provides over current and open circuit protection to prevent the circuit from operating in ranges that may result in damage to the components. As illustrated in FIG. 17, if a fault is sensed by the IC, the HO and LO drive signals are driven to an OFF or safety state to provide the appropriate protection for the components in the resonant converter.

The circuit diagram illustrated in FIG. 23 provides a resonant converter with the following characteristics:

line input voltage range: 400V±10%
output power: 300W
DC output voltage: 12V
minimal switching frequency: 60 kHz
Rfmin=15 k ohm
Rmin=9 k ohm $$R_{max} = \frac{R_{f\,min}R_{min}}{4R_{min} - R_{f\,min}\left(1 - \frac{\psi}{45}\right)} = 7.64 \text{ K}\Omega$$

Rcs=0.14 ohm

Figure 24:
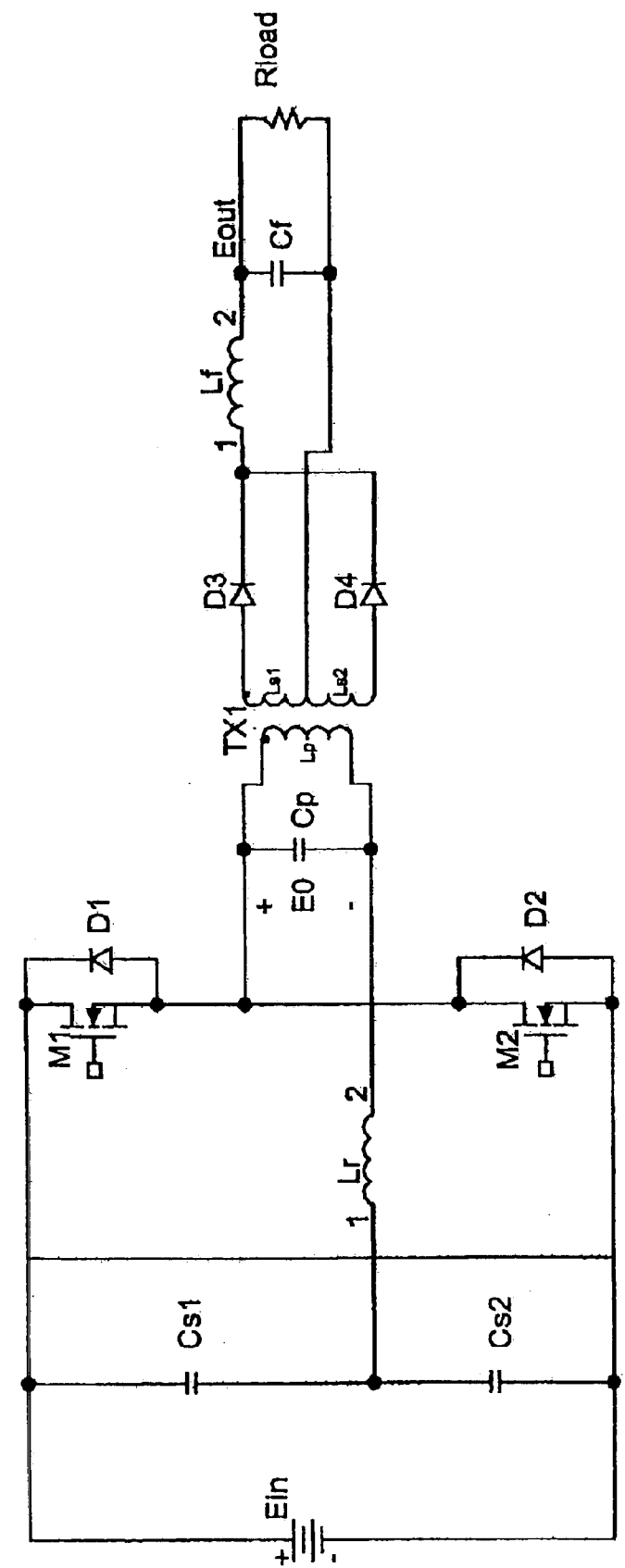
FIG. 24 is a block diagram illustrating the internal circuitry of an IC for implementing the phase delay control according to another embodiment of the present invention.

Referring to FIG. 24, a block diagram is shown of the phase delay control realized on an IC according to another embodiment of the present invention. The embodiment shown in FIG. 24 is similar to the embodiment of FIG. 16 except that unneeded functionality is removed and the circuit is simplified and optimized for a power converter. Accordingly, rather than a dimming measure indicated by pin DIM and voltage $V_{DIM}$ in FIGS. 16 and 20, respectively, the IC includes a phase delay control PDC on pin 4 that provides the same functionality as the dimming control in the embodiment of FIG. 16. Moreover, the embodiment of FIG. 24 does not include the functions of preheating and ignition that are provided in the embodiment of FIG. 16.

Figure 25:
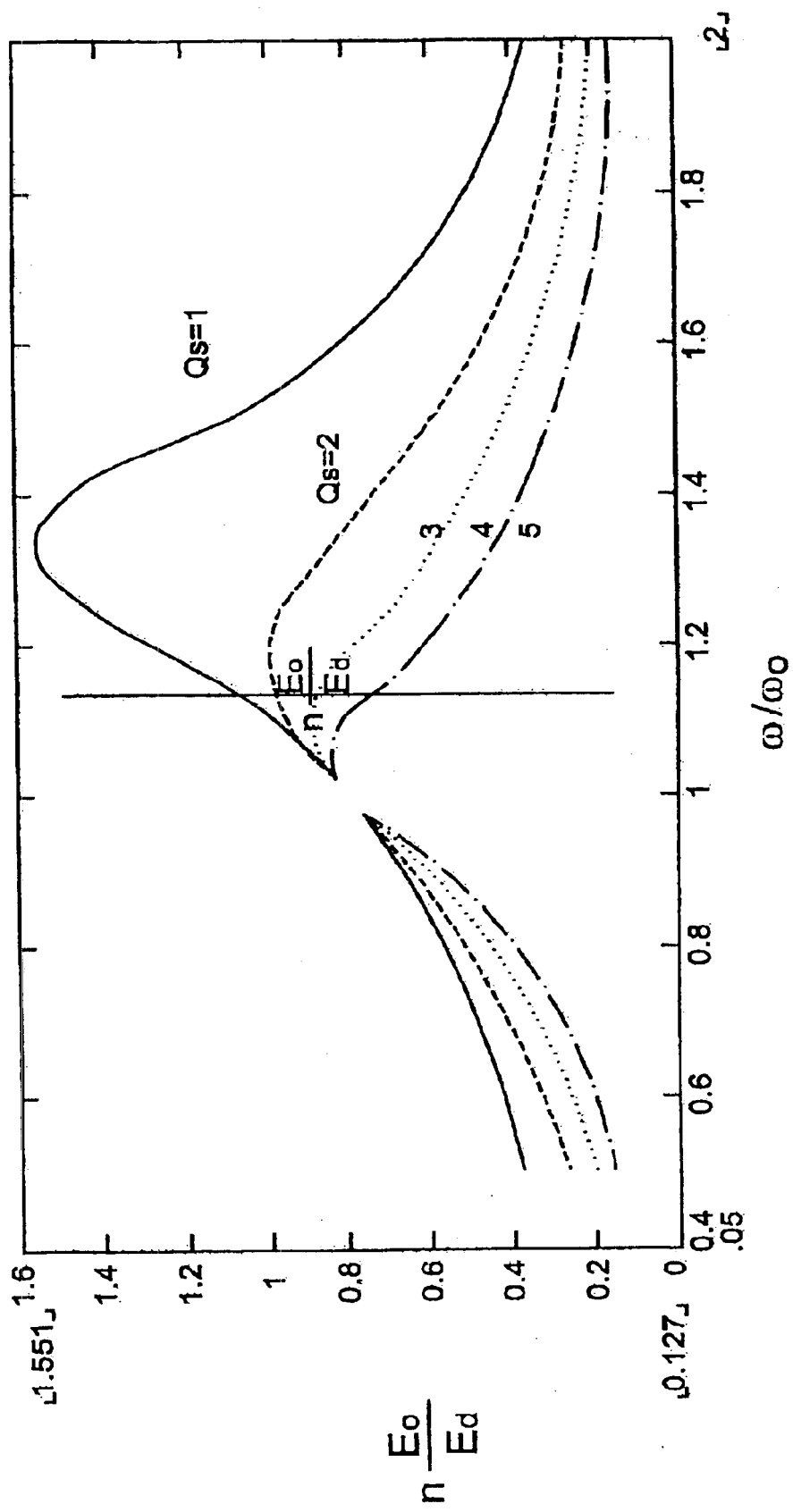
FIG. 25 is a state diagram illustrating the operation modes of the circuit in FIG. 24.

Referring to FIG. 25, a diagram illustrating the state operation of the IC circuit of FIG. 24 is illustrated. Note the lack of state modes for preheat or ignition functions for this embodiment. Instead, there is a soft-start mode for initializing operation of the power converter, which transitions to phase delay control in the absence of faults including over current and under voltage. In the phase delay control mode, the power converter operates normally, with fault protections enabled for over current, hard switching, and shut down commands. The phase delay control uses the PLL to track the phase angle feedback with a reference phase to control output power.

Figure 26:
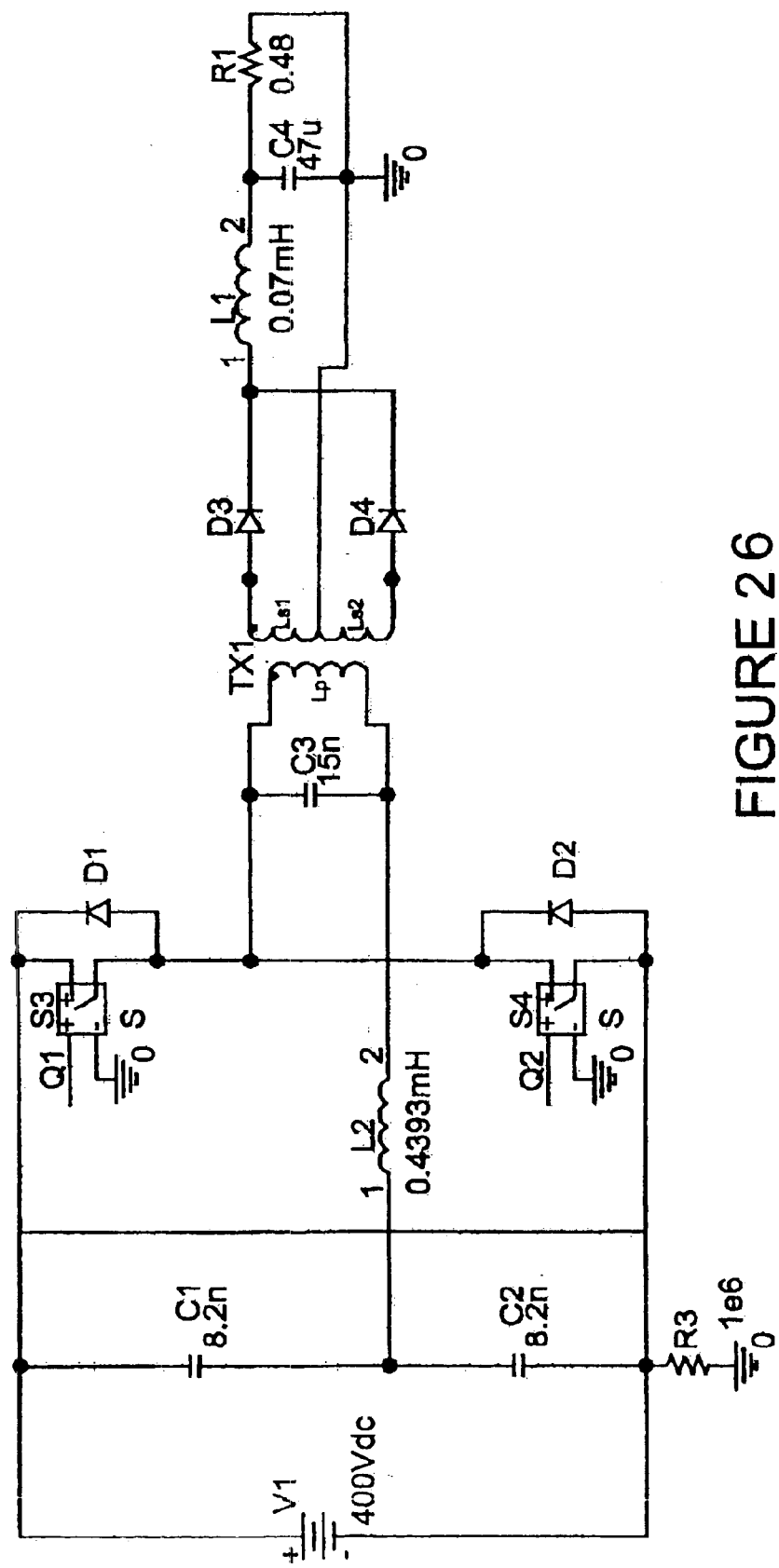
FIG. 26 is a circuit diagram illustrating an LCC resonant converter with a resonant tank circuit.

Referring to FIG. 26, an LCC resonant converter circuit topology model is illustrated. The switches M1 and M2 are switched by the output signals HO and LO, respectively.

Figure 27:
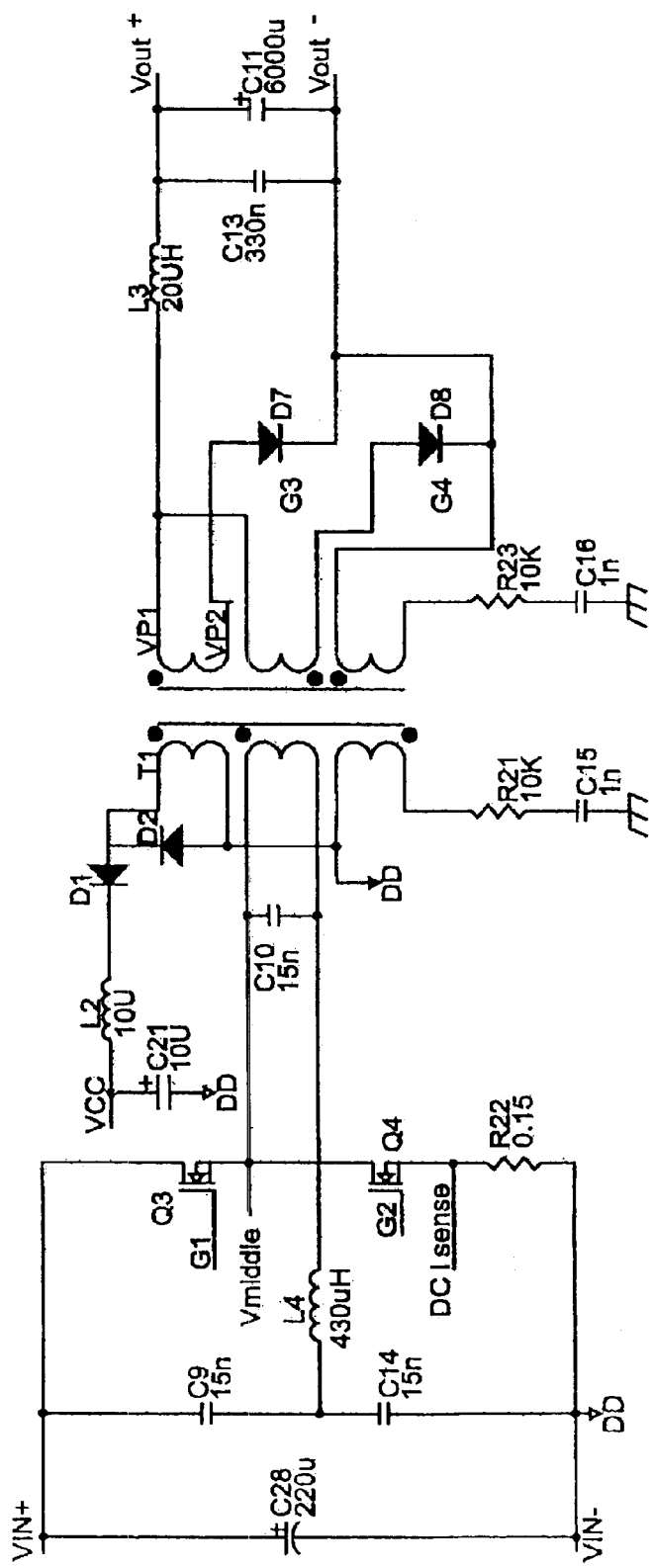
FIG. 27 is a graph illustrating a relationship between operating frequencies near resonant frequencies versus converter gain.

Referring now to FIG. 27, waveforms illustrating the converter gain for the LCC resonant converter are illustrated. As discussed above, the converter gains of interest are those that can be achieved when the operating frequency of the resonant converter is above the resonant frequency.

Figure 28:
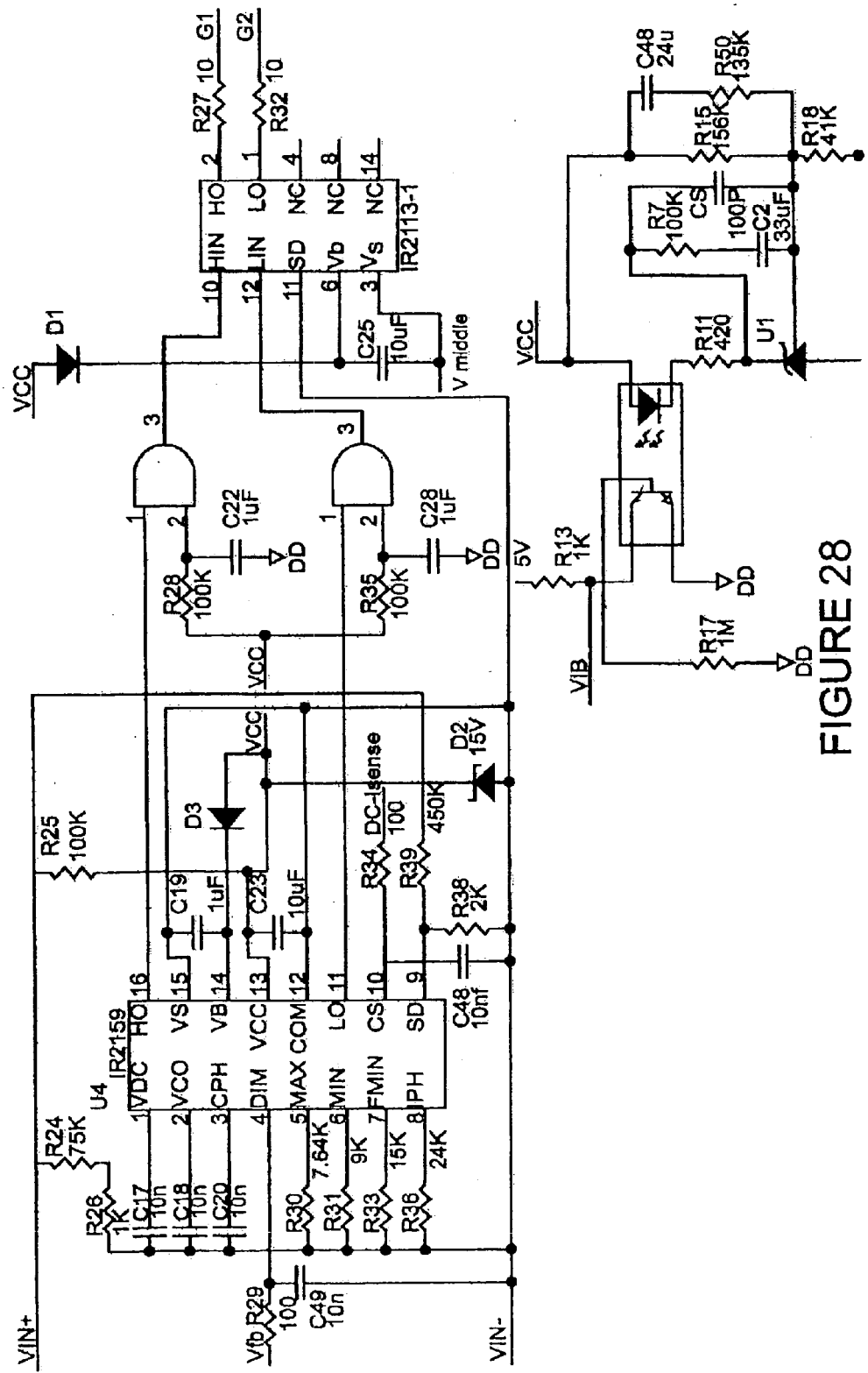
FIG. 28 is a simulation circuit diagram of the circuit of FIG. 26.

The phase delay control design according to the present invention was tested using an LCC resonant circuit simulation, as illustrated in FIG. 28. The switches with inputs Q1 and Q2 are models of power MOSFET switches used in the resonant converter. Accordingly, switch signals Q1 and Q2 are driven by the IC output signals HO and LO, respectively. The circuit simulation indicates that the phase delay control provides increased efficiencies and dynamic output range with a simplified design.

Figure 29:
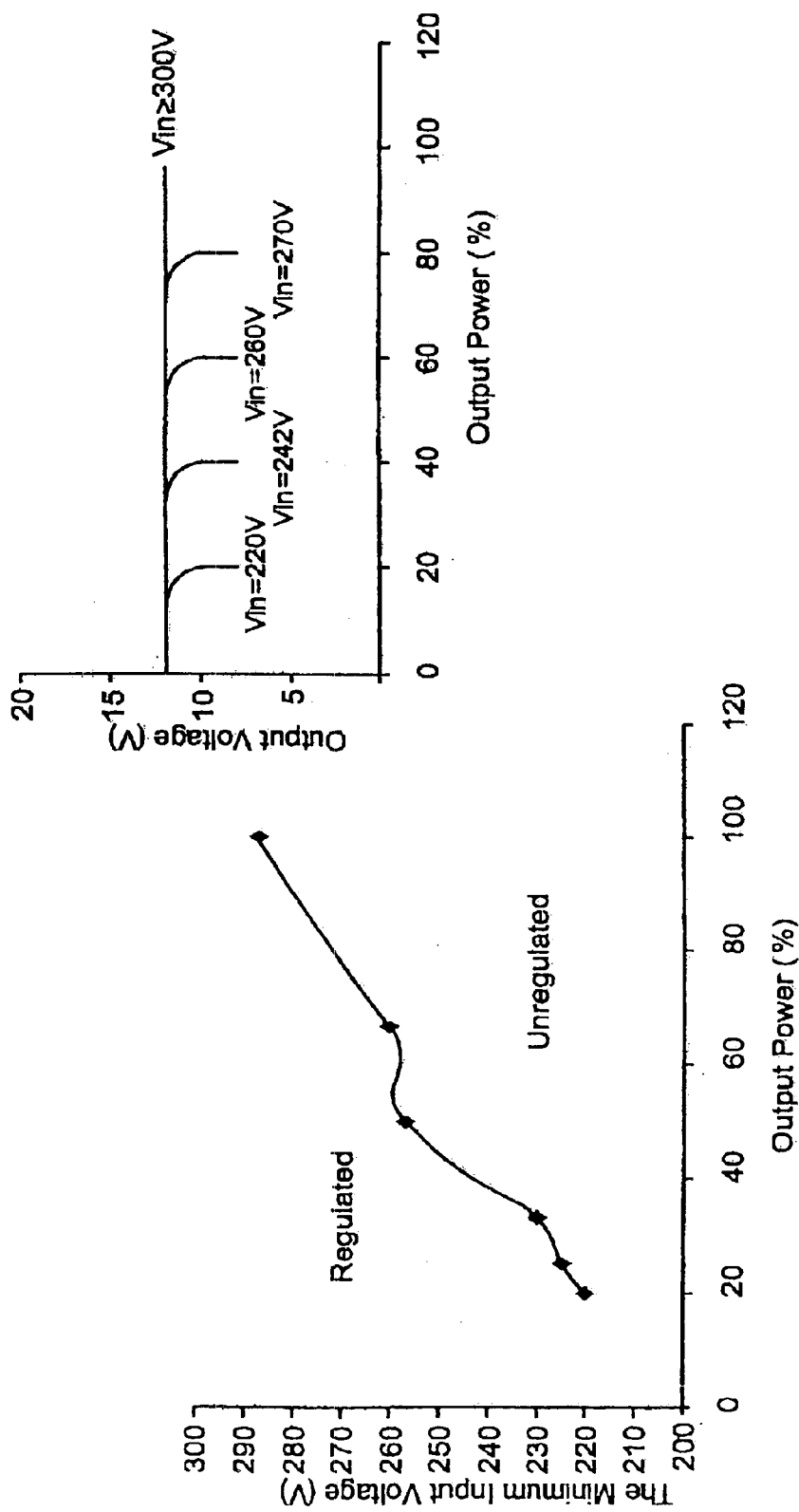
FIG. 29 is a circuit diagram of a power stage implementation in accordance with the present invention.

Referring now to FIG. 29, a circuit diagram of a power stage implementation in accordance with the present invention is illustrated. Note the LCC topology in the resonant stage of the converter.

Figure 30:
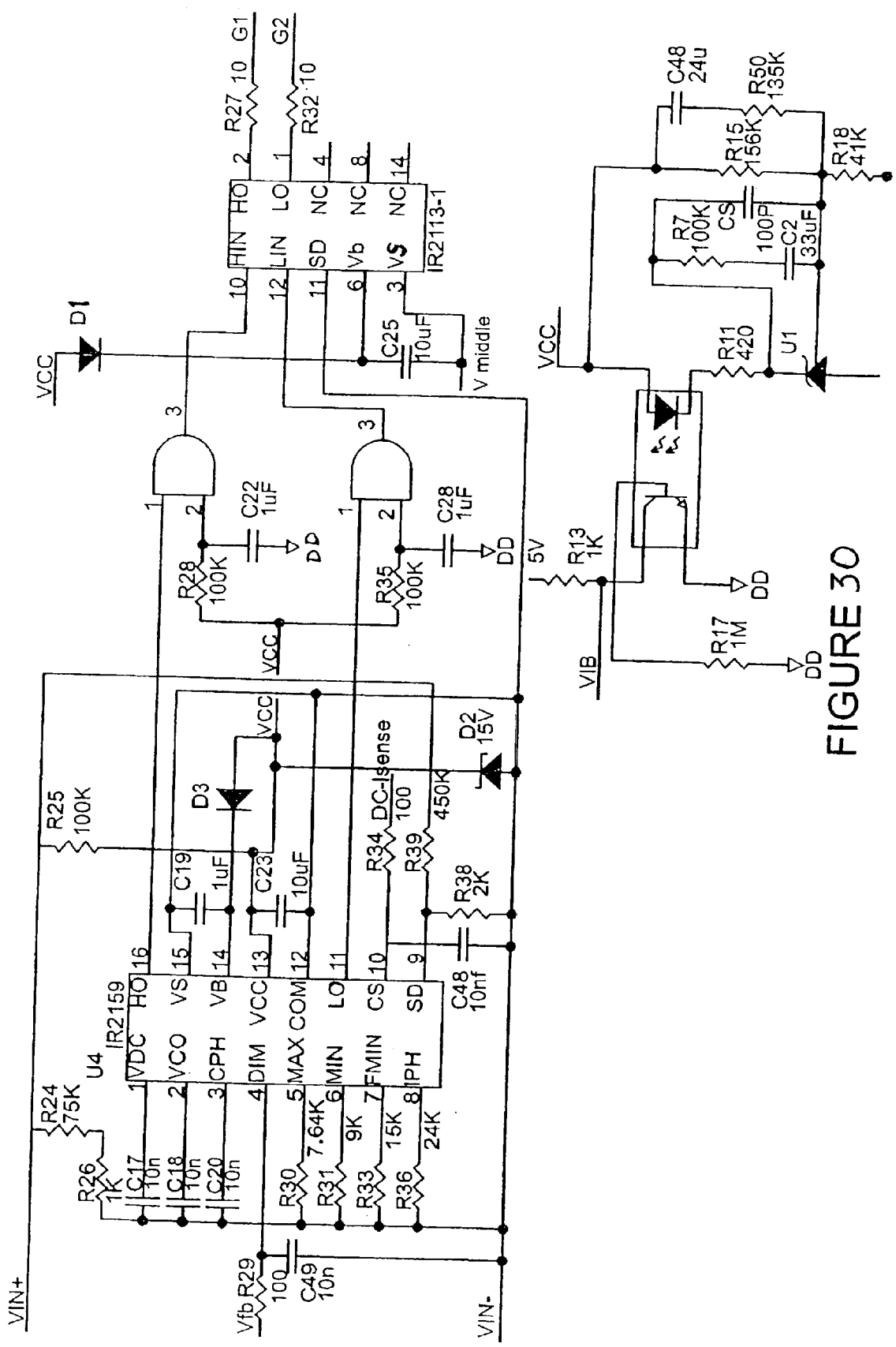
FIG. 30 is a circuit diagram illustrating selective function control of the IC for the resonant converter according to the present invention.

Referring now to FIG. 30, a circuit diagram of a control implementation is illustrated. The preheat and ignition functions offered by the IC are selectively removed from the circuit operation through the use of the delay circuit incorporating two AND gates. The control signals supplied by the AND gates are provided to a MOSFET driver that provides the signals to drive the MOSFET switches.

Figure 31:
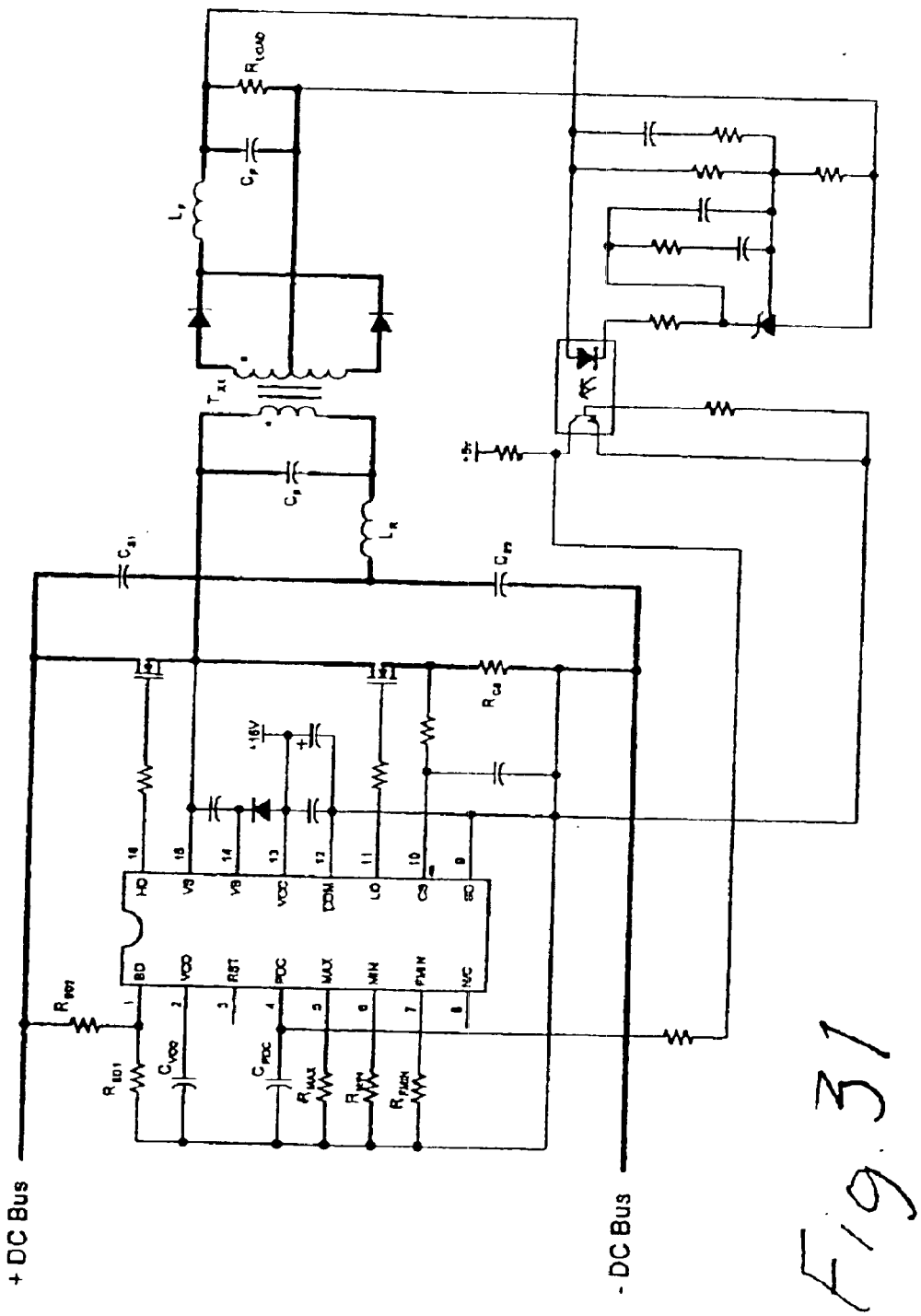
FIG. 31 is a circuit diagram illustrating control and power connectivity for the controller of FIG. 24.

Referring to FIG. 31, an implementation of control and power stage portions of the power converter is illustrated with the control IC of the embodiment of FIG. 24. Again, the LCC topology for the resonant stage of the converter is used to obtain the linearity and control characteristics desirable for the phase delay control. Operational parameters are programmed with $R_{MAX}$, $R_{MIN}$ and $R_{FMIN}$, in accordance with the desired functionality described in the graph of FIG. 20.

Measurements of circuit parameters were obtained with the resonant converter operating at full load and 20% of full load. Measurements were obtained for the drain voltage of the high side switch, the drain current for the low side switch, the capacitor voltage, the inductor current and the voltage on the primary side of the transformer. It was observed that when a MOSFET switch in the circuit is turned on, the body diode is conducting, to permit the MOSFET to be turned on at zero voltage to avoid switching losses. However, higher voltage and current peak levels were observed on the components of the resonant converters that would be typical with a PWM converter. The change in the phase delay for the resonant converter is small, even when the load changes, because the ratio of the switching frequency and the resonant frequency experiences changes that are relatively small.

The drain voltage for the high side switch and the drain current for the low side switch were measured with output voltages of 8.4 and 12V, resulting in the following observations. Giving the operating characteristics of the resonant circuit remaining the same based on the load, a change in output voltage produces a corresponding change in output power. The switching frequency is observed to change accordingly, and the observed phase delay is modified in accordance with the present invention to track the reference phase.

Figure 32:
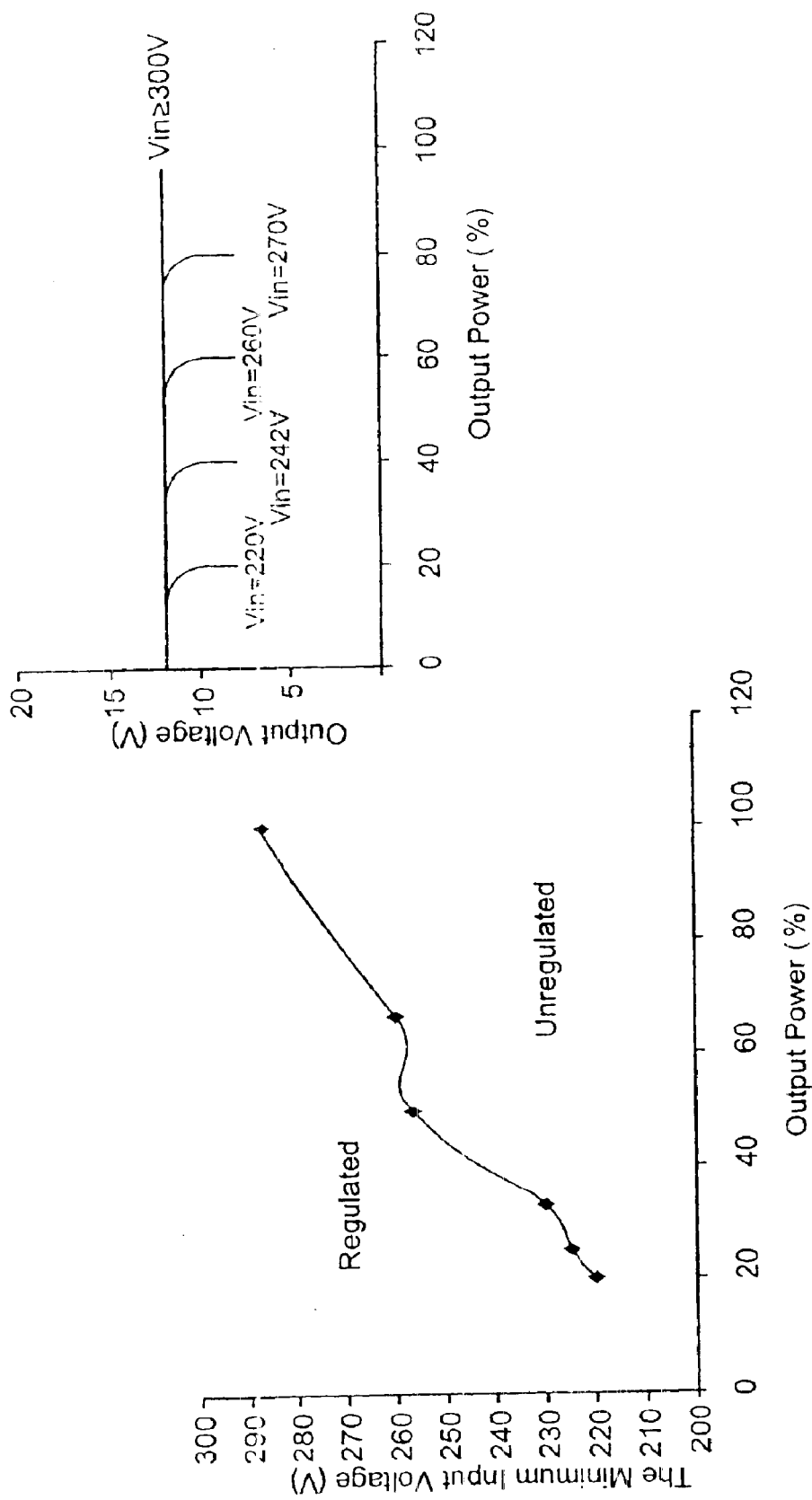
FIG. 32 shows graphs representing a relationship between output power, input voltage and output voltage for the resonant converter.

Referring now to FIG. 32, graphs illustrating output power percentage versus input and output voltage are shown. FIG. 32 illustrates that the output voltage can be regulated depending upon a minimum input voltage, but may be unregulated if the minimum input voltage falls below a certain value, as dependent upon output power percentage. For example, at 20% of full load, the output voltage can be regulated when the input voltage is above 220V. The demarcation for output voltage regulation varies depending upon the percentage of full load output power demanded.

The phase delay control of the present invention provides that the switching frequency of the power converter is above the resonant frequency, to achieve high performance and system protection. In addition, by programming the minimal phase, hard switching at light load conditions can be limited. The phase delay control provides an advantage over a variable frequency controller through realizing limited hard switching at light loads, which is much more difficult to achieve with traditional frequency control. The phase delay control of the present invention has improved linear output characteristics over that of frequency control as well. Another advantage of the present invention is that the current sensing resistor $R_{CS}$ can have a dual function of both current sensing and over current protection. Accordingly, the need for additional components to carry out both functions is eliminated.

Another advantage of the present invention is that the phase delay control is independent of component tolerances and permits the stray inductance of the transformer to serve as the primary inductance for the LCC resonant converter topology. Many other types of topologies can be used with this control configuration, which through minimum phase limitations can desensitize the resonant circuit from component tolerances. Accordingly, the resonant converter of the present invention permits generally higher frequency ranges in comparison to PWM converters.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A power converter controller for controlling a resonant power converter, comprising:
   phase detection circuitry for indicating a feedback phase angle, wherein the feedback phase angle is determined by a feedback signal from a power converter output;
   a phase locked loop circuit for controlling a switching frequency of the power converter, the phase locked loop generating an error signal based on the feedback phase angle and a reference phase angle; and
   a variable frequency oscillator for adjusting the switching frequency of the resonant power converter, the error signal of the phase locked loop being operable to influence the variable frequency oscillator to adjust its frequency and thereby influence the phase of the power converter output such that the error signal is urged toward zero.

2. A power converter controller according to claim 1, further comprising a resistor coupled to the power converter output to provide the feedback signal.

3. A power converter controller according to claim 2, wherein the resistor is coupled to a low side switch of a half bridge switching arrangement.

4. A power converter controller according to claim 1, further comprising current sense circuitry for determining the feedback signal from the power converter output and for enunciating faults to permit the resonant power converter to be placed in a safety mode of operation.

5. A power converter controller according to claim 1, wherein the controller is implemented on an IC.

6. A power converter controller according to claim 1, further comprising selection circuitry for selectively enabling or disabling controller functions.

7. A power converter controller according to claim 1, wherein the resonant power converter has a resonant frequency, and the switching frequency is equal to or greater than the resonant frequency.

8. A power converter controller according to claim 1, further comprising a blanking circuit coupled to the phase detection circuitry for detecting the feedback phase angle for after a specified period of time.

9. A power converter controller according to claim 8, wherein the specified period of time is about 400 nanoseconds.

10. A power converter controller according to claim 1, wherein the reference phase angle acts as a control and is operable in a range of from about 0 to about −90°.

11. A power converter controller according to claim 1, wherein the resonant power converter includes an LCC circuit.

12. A switching power converter having a regulated power output through the operation of power switches in a half bridge configuration, wherein the switching of the switches is controlled by the power converter controller according to claim 1.

13. A power converter controller according to claim 1, further comprising programmable inputs for determining a minimum shift and a maximum shift in the reference phase angle.

14. A power converter controller according to claim 1, wherein a primary inductance of the resonant power converter is supplied through a transformer.

15. A power converter, comprising:
   an electrical energy transfer circuit for transferring electrical energy;
   a switch coupled to the transfer circuit for switching electrical energy to the transfer circuit;
   a controller coupled to the switch for controlling the switching of the switch in order to transfer the electrical energy;
   a sensing device coupled to the switch and to the controller for providing a signal to the controller;
   a phase detection circuit in the controller for providing a feedback phase angle the signal; and
   a phase locked loop in the controller operable to accept the feedback phase angle and provide a switching control for switching the switch such that a phase of the electrical energy in the electrical energy transfer circuit is adjustable to drive to zero a difference between the feedback phase angle and a reference phase angle.

16. A power converter according to claim 15, wherein the phase locked loop further comprises a variable frequency oscillator to provide a variable frequency output for adjusting the phase in the electrical energy transfer circuit.

17. A power converter according to claim 15, wherein the sensing device is a resistor, across which a voltage measurement can be taken to obtain the signal.

18. A power converter according to claim 15, wherein the controller circuit is incorporated into an IC.

19. A power converter according to claim 15, further comprising a function selection circuit coupled to the controller for selectively adjusting controller functions.

20. A power converter according to claim 15, wherein the controller further comprises a blanking device for masking the signal for a specified time interval.

21. A method for controlling a resonant power converter with a resonant circuit through a phase delay control, comprising:
   measuring a phase angle of a control output coupled to the resonant circuit;
   comparing the phase angle to a reference phase angle to obtain a phase angle error signal;
   applying the phase angle error signal to a phase locked loop to adjust a switching frequency through a voltage controlled oscillator in the phase locked loop; and
   decreasing the phase angle error signal by adjusting the switching frequency such that the phase angle tracks the reference phase angle to control power supplied by the resonant power converter.

22. A method for controlling a resonant power converter with a resonant circuit through a phase delay control, comprising:
   enabling the resonant power converter;
   configuring a voltage controlled oscillator to its maximum frequency, the voltage controlled oscillator providing a switching frequency to control power supplied by the resonant power converter;
   determining a phase angle of a reference signal and a phase angle of a control output that is coupled to the resonant circuit and applying the reference signal phase angle and the control output phase angle to a phase locked loop; and decreasing the switching frequency provided by the voltage controlled oscillator using the phase locked loop until the phased locked loop determines that the control output phase angle tracks the reference signal phase angle.

23. The method of claim 22 further comprising the steps of:

upon detecting a fault condition, disabling the resonant power converter;

upon removal of the fault condition, re-enabling the resonant power converter and setting the switching frequency of the voltage controlled oscillator to its maximum frequency; and decreasing the switching frequency provided by the voltage controlled oscillator using the phase locked loop until the phased locked loop determines that the control output phase angle tracks the reference signal phase angle.

* * * * *